United States Patent
Yamamori et al.

(10) Patent No.: US 12,480,569 B2
(45) Date of Patent: Nov. 25, 2025

(54) PULLEY WITH TWO FLANGES, AND METHOD OF PRODUCING PULLEY WITH TWO FLANGES

(71) Applicants: JTEKT CORPORATION, Kariya (JP); NAKANISHI METAL WORKS CO., LTD., Osaka (JP)

(72) Inventors: Ayumi Yamamori, Kariya (JP); Shuhei Yamashita, Kariya (JP); Masayoshi Nakamura, Osaka (JP); Ryotaro Taniguchi, Osaka (JP)

(73) Assignees: JTEKT CORPORATION, Osaka (JP); NAKANISHI METAL WORKS CO., LTD., Osaka (JP)

( * ) Notice: Subject to any disclaimer, the term of this patent is extended or adjusted under 35 U.S.C. 154(b) by 0 days.

(21) Appl. No.: 18/105,098

(22) Filed: Feb. 2, 2023

(65) Prior Publication Data

US 2023/0258256 A1 Aug. 17, 2023

(30) Foreign Application Priority Data

Feb. 8, 2022 (JP) .................................. 2022-017788

(51) Int. Cl.
*F16H 55/48* (2006.01)
*F16H 55/36* (2006.01)
(52) U.S. Cl.
CPC .................................. *F16H 55/36* (2013.01)
(58) Field of Classification Search
CPC .. F16H 55/36; F16H 55/48; F16H 2007/0865; F16H 55/171; F16H 55/17;

(Continued)

(56) References Cited

U.S. PATENT DOCUMENTS 3,633,432 A * 1/1972 Horsey ................... F16H 55/48
474/181
4,052,020 A * 10/1977 Knox ..................... B65H 75/14
242/608.8

(Continued)

FOREIGN PATENT DOCUMENTS

| DE | 102018201630 A1 | * | 8/2019 |
| JP | 2013-096500 A | | 5/2013 |
| JP | 2018083323 A | * | 5/2018 |

*Primary Examiner* — Anna M Momper
*Assistant Examiner* — Katelynne R Burrell
(74) *Attorney, Agent, or Firm* — Kratz, Quintos & Hanson, LLP

(57) ABSTRACT

A pulley body has a first flange and a fitting protrusion. The flange body has a second flange and a fitting recess fitted to the fitting protrusion. The fitting recess has an inner surface including, in a radially inward direction, a first inclined surface inclined so as to approach the first flange, as extending in the radially inward direction. The fitting protrusion has a distal end surface including, in the radially inward direction, a second inclined surface facing the first inclined surface. The flange body has an outer peripheral surface that faces an inner peripheral surface of the pulley body, and has a protrusion which continues in a circumferential direction with no end. A region including an annular-shaped area between the first and second inclined surfaces includes a joint portion of a molten resin.

6 Claims, 12 Drawing Sheets

(58) Field of Classification Search
CPC ... F16H 55/46; F16H 2055/363; B29C 66/05; B29C 66/124; B29C 66/128; B29C 66/10; B29C 45/14; B29C 45/1459; B29C 2945/7647; B29C 66/20; B29C 66/08; B29C 66/322; B29C 65/08; B29D 15/00
USPC ............... 474/166, 183, 179, 902, 152, 161
See application file for complete search history.

(56) References Cited

U.S. PATENT DOCUMENTS

| | | | | |
|---|---|---|---|---|
| 4,571,226 | A * | 2/1986 | Molloy | B29C 65/0672 |
| | | | | 474/902 |
| 11,084,193 | B2 * | 8/2021 | Nakamura | B29C 45/14065 |
| 2003/0132677 | A1 * | 7/2003 | Tabuchi | F16H 55/49 |
| | | | | 310/90 |
| 2006/0178241 | A1 * | 8/2006 | Nosaka | F16H 57/04 |
| | | | | 474/166 |
| 2012/0015768 | A1 * | 1/2012 | Serkh | F16H 55/36 |
| | | | | 474/94 |
| 2015/0226304 | A1 * | 8/2015 | Dumanski | F16H 55/14 |
| | | | | 74/440 |

* cited by examiner

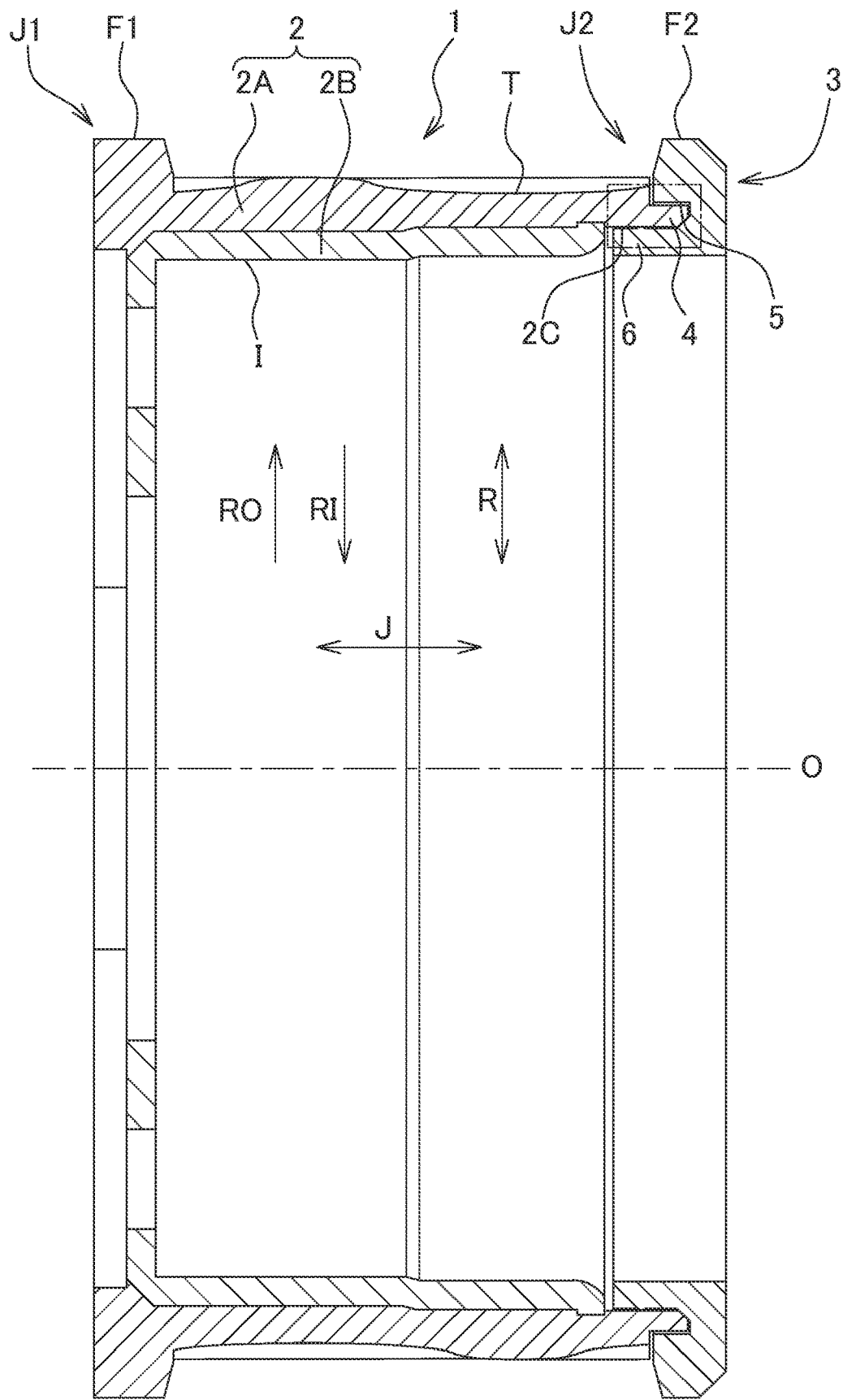

FIG. 9
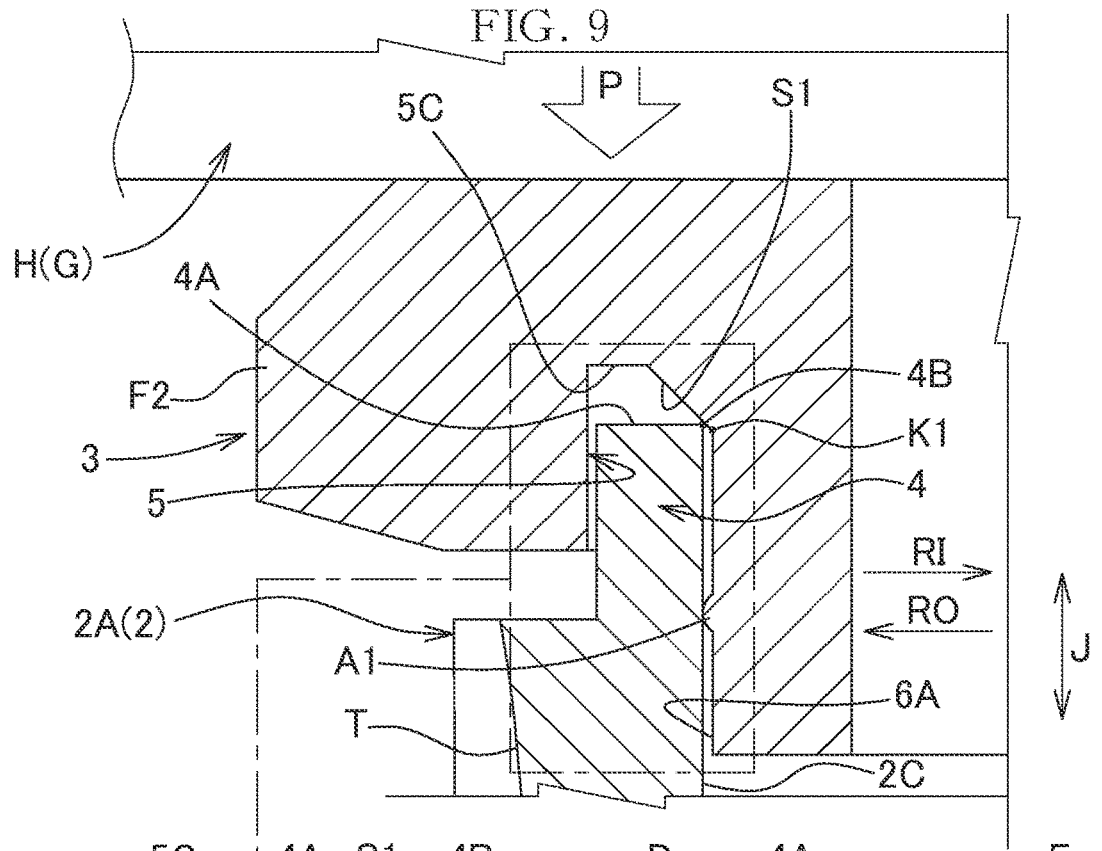
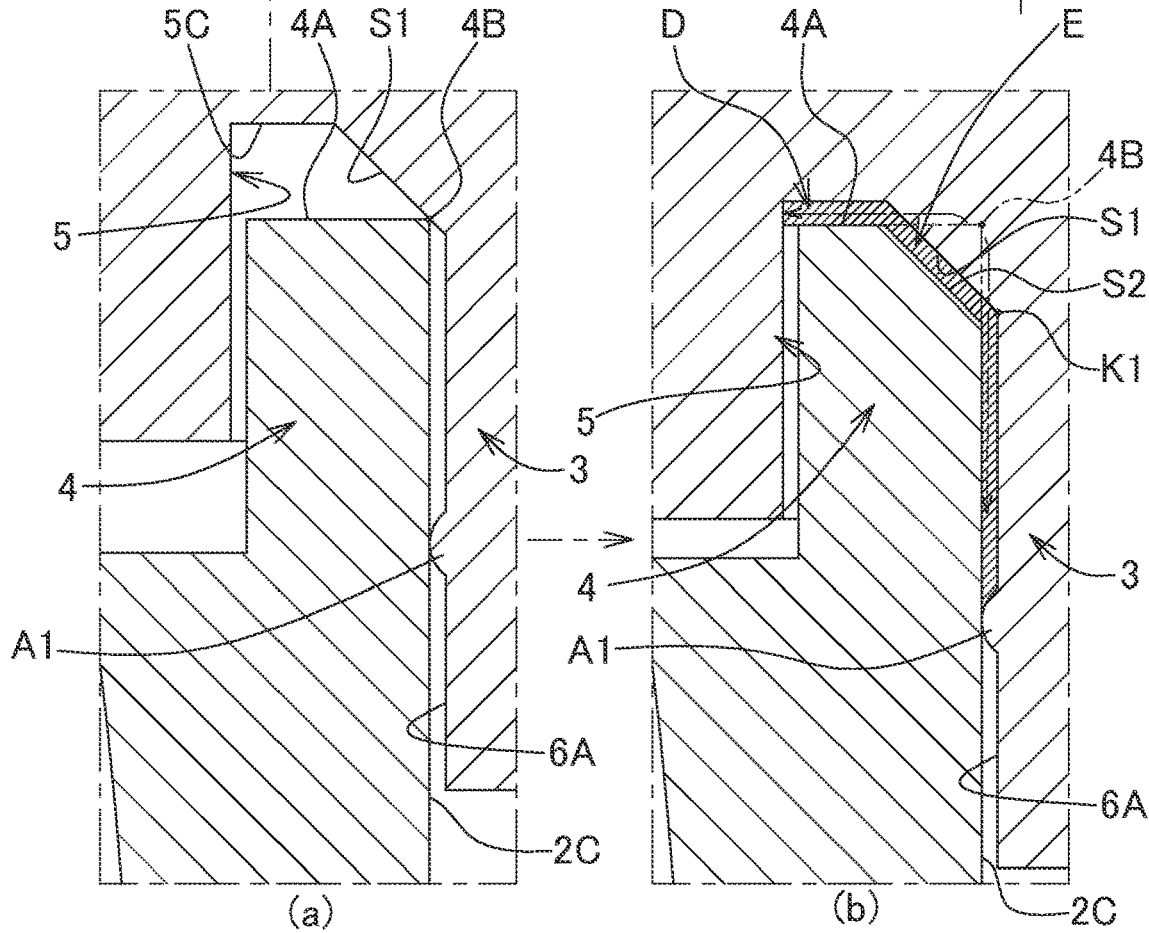
(a)  (b)

FIG. 13
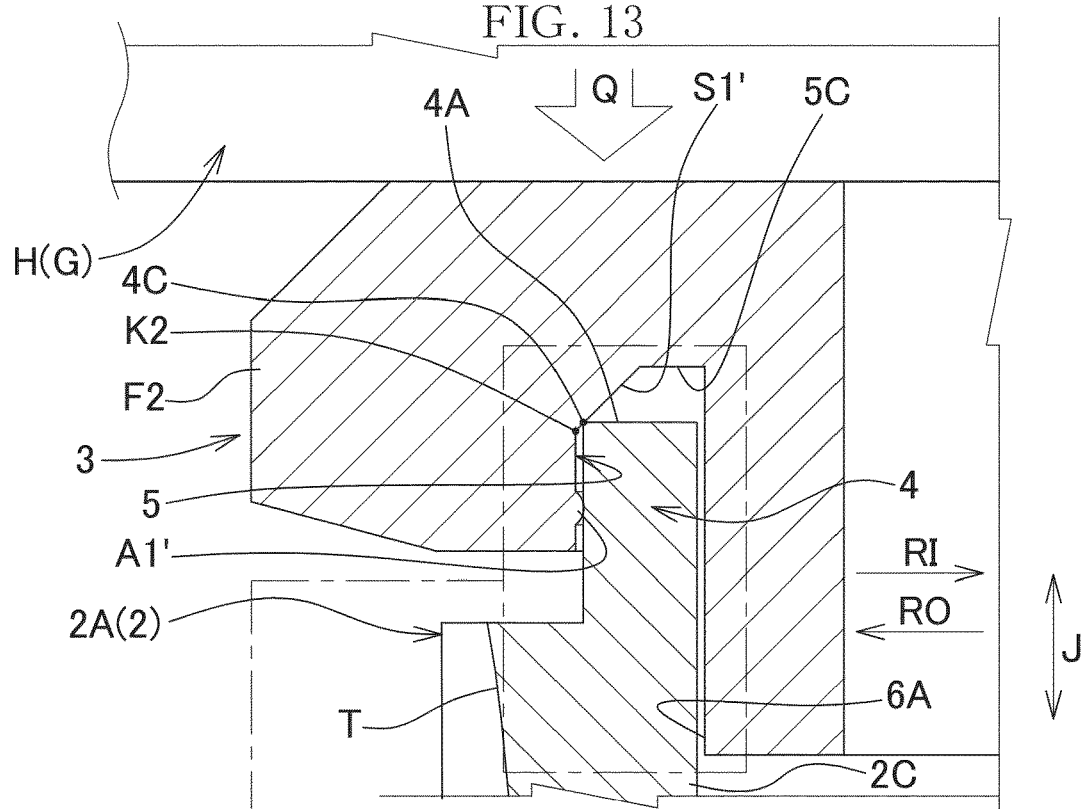
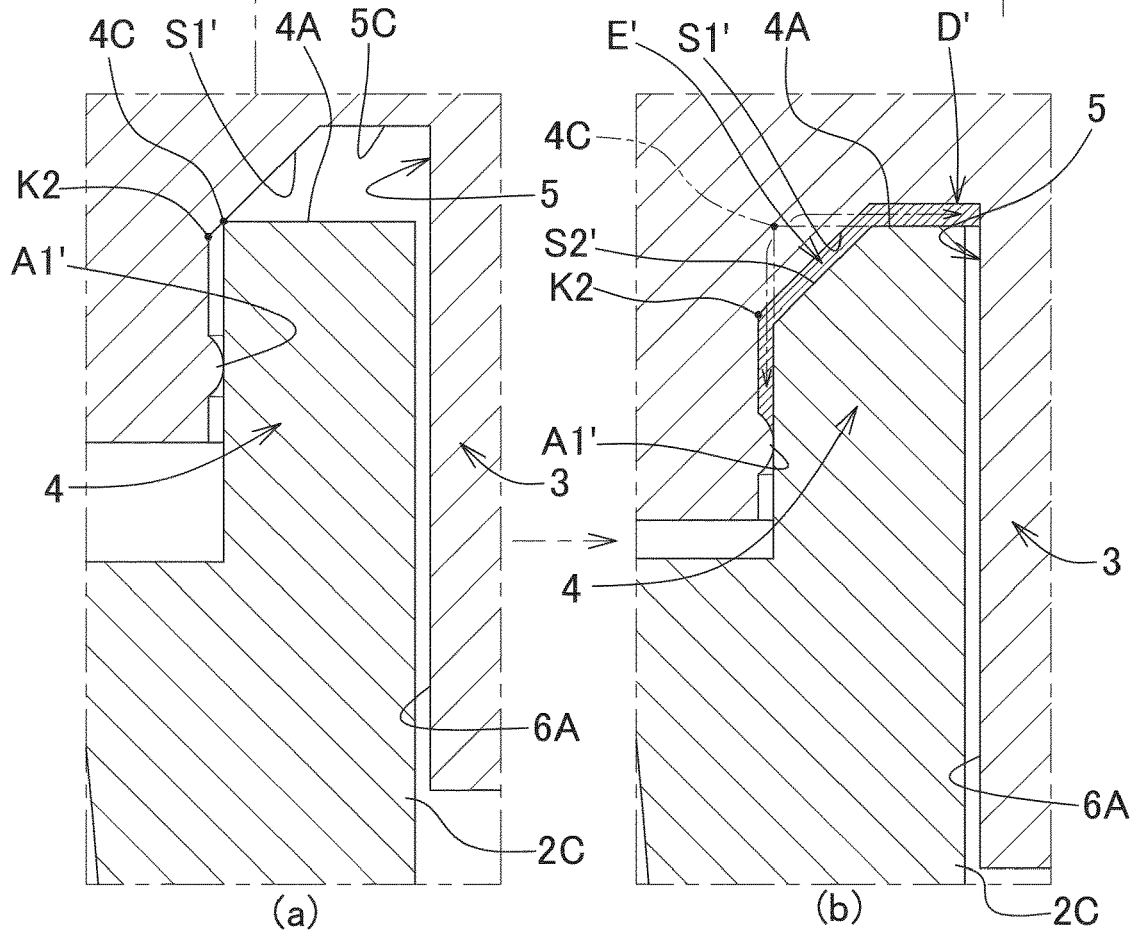

PULLEY WITH TWO FLANGES, AND METHOD OF PRODUCING PULLEY WITH TWO FLANGES

FIELD OF THE INVENTION

The present invention relates to a pulley with two flanges, which is to engage with a toothed belt.

BACKGROUND

For a toothed pulley to engage with a toothed belt, a pulley with two flanges, in which the flanges are respectively provided in both side surfaces of the pulley in a width direction to prevent the toothed belt from being disconnected.

Upon molding a toothed pulley with two flanges uniformly by using an injection molding die and a synthetic resin material, the flanges are caught by the molding die. Thus, the molded toothed pulley cannot be taken out from the molding die in the axial direction. In view of the above, the toothed pulley with two flanges is formed using separate injection molding dies, one for a pulley body, and the other for a flange body, so that the pulley body and the flange body can be taken out from the respective molding dies in the axial direction (see PTL 1, for example). As means of joining the molded pulley body and the flange body, ultrasonic welding is used.

CITATION LIST

Patent Literature

[PTL1] Japanese Unexamined Patent Application Publication No. JP 2013-96500

SUMMARY

Technical Problem

When a pulley body and a flange body are joined by ultrasonic welding, a weld burr ejected from a joining portion is raised as one of problems (see paragraph 0004 of PTL 1, for example). The weld burr may cause defects as follows: component parts cannot be assembled; dropped weld burrs are caught between the component parts, leading to malfunction; and the like. In view of the above, the weld burrs should be removed and processed. However, this causes a producing cost to increase.

A purpose of the present invention is to provide a pulley with two flanges, which prevents a weld burr from being ejected even if a pulley body provided with one flange and a flange body provided with the other flange are welded by the ultrasonic welding, and a method of producing such a pulley with two flanges.

Solution to Problem

A pulley with two flanges according to a first aspect of the present invention includes: a pulley body; and a flange body joined to the pulley body in a male-female fitting manner. The pulley body includes: a first flange that protrudes outward in a radial direction perpendicular to a rotation axis, at a first end of the pulley body in an axial direction parallel to the rotation axis; and a fitting protrusion that has an annular shape and protrudes in the axial direction, at a second end of the pulley body in the axial direction. The flange body is positioned in the second end of the pulley body in the axial direction, has a second flange that protrudes outward in the radial direction, and has a fitting recess that is fitted to the fitting protrusion, is hollowed in the axial direction, and has an annular shape. The fitting recess has an annular inner surface including, inward in the radial direction, a first inclined surface that has a shape of a side surface of a truncated cone, the first inclined surface being inclined so as to approach the first end of the pulley body in the axial direction as extending inward in the radial direction. The fitting protrusion has a distal end surface including, inward in the radial direction, a second inclined surface that faces the first inclined surface. The flange body has an outer peripheral surface that: is connected to an end portion, inward in the radial direction, of the first inclined surface; and faces an inner peripheral surface of the pulley body, the outer peripheral surface having one of a protrusion and a recessed groove, which have no end and continue in a circumferential direction. A region including an annular-shaped area between the first inclined surface and the second inclined surface includes a joint portion of a molten resin.

According to the pulley with two flanges of the first aspect of the present invention, the outer peripheral surface of the flange body is connected to the end portion, in the radially inward direction, of the first inclined surface in the radially inward direction of the fitting recess. The outer peripheral surface has one of the protrusion and the recessed groove which continue in the circumferential direction with no end. The protrusion and the recessed groove face the inner peripheral surface of the pulley body. The protrusion or the recessed groove is provided in a path through which a molten resin generated at ultrasonic welding of the pulley body and the flange body mainly flows. Accordingly, the molten resin can be prevented from moving over the protrusion or the recessed groove. Therefore, if the pulley body and the flange body are joined using an ultrasonic welding machine, weld burrs are not ejected.

A pulley with two flanges according to a second aspect of the present invention includes: a pulley body; and a flange body joined to the pulley body in a male-female fitting manner. The pulley body includes: a first flange that protrudes outward in a radial direction perpendicular to a rotation axis, at a first end of the pulley body in an axial direction parallel to the rotation axis; and a fitting protrusion that has an annular shape and protrudes in the axial direction, at a second end of the pulley body in the axial direction. The flange body is positioned in the second end of the pulley body in the axial direction, has a second flange that protrudes outward in the radial direction, and has a fitting recess that is fitted to the fitting protrusion, is hollowed in the axial direction, and has an annular shape. The fitting recess has an annular inner surface including, inward in the radial direction, a first inclined surface that has a shape of a side surface of a truncated cone, the first inclined surface being inclined so as to approach the first end of the pulley body in the axial direction as extending inward in the radial direction. The fitting protrusion has a distal end surface including, outward in the radial direction, a second inclined surface that faces the first inclined surface. The flange body has an inner peripheral surface that: is connected to an end portion, outward in the radial direction, of the first inclined surface; and faces an outer peripheral surface of the fitting protrusion of the pulley body, the inner peripheral surface having one of a protrusion and a recessed groove, which have no end and continue in a circumferential direction. A region including an annular-shaped area between the first inclined surface and the second inclined surface includes a joint portion of a molten resin.

According to the pulley with two flanges of the second aspect of the present invention, the inner peripheral surface of the flange body is connected to the end portion, in the radially outward direction, of the first inclined surface in the radially outward direction of the fitting recess. The inner peripheral surface has one of the protrusion and the recessed groove which continue in the circumferential direction with no end. The protrusion or the recessed groove faces the outer peripheral surface of the fitting protrusion of the pulley body. The protrusion or the recessed groove is provided in a path through which a molten resin generated at ultrasonic welding of the pulley body and the flange body mainly flows. Accordingly, the molten resin can be prevented from moving over the protrusion or the recessed groove. Therefore, if the pulley body and the flange body are joined using an ultrasonic welding machine, weld burrs are not ejected.

According to a pulley with two flanges of a third aspect of the present invention, in the pulley with two flanges of the first aspect, the inner peripheral surface of the flange body is provided with one of the second protrusion and the second recessed groove which are continuous in the circumferential direction with no end. The inner peripheral surface faces the outer peripheral surface of the fitting protrusion of the pulley body.

According to the pulley with two flanges of the third aspect of the present invention, the second protrusion or the second recessed groove exists in a path through which the molten resin flows along the outer peripheral surface of the pulley body from a distal end surface of the fitting protrusion of the pulley body, when a volume of the molten resin at ultrasonic welding is large. Accordingly, the molten resin can be prevented from moving over the second protrusion or the second recessed groove. Therefore, if the pulley body and the flange body are joined using an ultrasonic welding machine and a volume of the molten resin is large, weld burrs are not ejected.

According to a pulley with two flanges of a fourth aspect of the present invention, in the pulley with two flanges of the second aspect, the outer peripheral surface of the flange body is further provided with one of a second protrusion and a second recessed groove which continue in the circumferential direction with no end. The outer peripheral surface faces the inner peripheral surface of the pulley body.

According to the pulley with two flanges of the fourth aspect of the present invention, the second protrusion or the second recessed groove exists in a path through which the molten resin flows along the inner peripheral surface of the pulley body from a distal end surface of the fitting protrusion of the pulley body, when a volume of the molten resin at ultrasonic welding is large. Accordingly, the molten resin can be prevented from moving over the second protrusion or the second recessed groove. Therefore, even if the pulley body and the flange body are joined using an ultrasonic welding machine and a volume of the molten resin is large, weld burrs are not ejected.

A method of producing a pulley with two flanges; according to a fifth aspect of the present invention, is a method of producing a pulley with two flanges, which includes a pulley body made of a synthetic resin and a flange body that is joined to the pulley body in a male-female fitting manner and is made of a synthetic resin.

The pulley body includes: a first flange that protrudes outward in a radial direction perpendicular to a rotation axis, at a first end of the pulley body in an axial direction parallel to the rotation axis; and a fitting protrusion that has an annular shape and protrudes in the axial direction, at a second end of the pulley body in the axial direction. The flange body is positioned in the second end of the pulley body in the axial direction, has a second flange that protrudes outward in the radial direction, and has a fitting recess that is fitted to the fitting protrusion, is hollowed in the axial direction, and has an annular shape. The fitting recess has an annular inner surface including, inward in the radial direction, a first inclined surface that has a shape of a side surface of a truncated cone, the first inclined surface being inclined so as to approach the first end of the pulley body in the axial direction as extending inward in the radial direction. The fitting protrusion of the pulley body has a corner that has a circular shape and faces the first inclined surface. The flange body has an outer peripheral surface that is connected to an end portion, inward in the radial direction, of the first inclined surface, and has one of a protrusion and a recessed groove, which have no end and continue in a circumferential direction.

The method of pulley with two flanges according to the fifth aspect of the present invention includes: molding the pulley body through injection molding; molding the flange body through the injection molding; placing the pulley body molded so that the first flange is placed on a bottom and the axial direction corresponds to a vertical direction; placing the flange body molded on the pulley body so that the fitting recess is fitted to the fitting protrusion of the pulley body; and transmitting ultrasonic vibration of a hone of an ultrasonic welding machine to an inside of the flange body and an inside of the pulley body while pushing the flange body downward by the hone, so as to melt the corner of the pulley body mainly, thereby joining the flange body to the pulley body.

According to the method of producing a pulley with two flanges of the fifth aspect of the present invention, the fitting recess of the flange body has the annular inner surface that includes, inward in the radial direction, a first inclined surface that has a shape of a side surface of a truncated cone. In addition, the fitting protrusion of the pulley body has the corner that has the circular shape and faces the first inclined surface. The flange body has the outer peripheral surface that: is connected to an end portion, inward in the radial direction, of the first inclined surface; and has one of the protrusion and the recessed groove, which have no end and continue in the circumferential direction. The protrusion or the recessed groove faces the inner peripheral surface of the pulley body.

The molded flange body is placed on the pulley body so that the fitting recess is fitted to the fitting protrusion of the pulley body. The ultrasonic vibration of the hone of the ultrasonic welding machine is transmitted to the inside of the flange body and the inside of the pulley body while pushing the flange body downward by the hone, so as to melt the corner of the pulley body mainly. Accordingly, the protrusion or the recessed groove exists in a path through which the molten resin flows mainly, thereby preventing the molten resin from moving over the protrusion or the recessed groove. Therefore, if the pulley body and the flange body are joined using an ultrasonic welding machine, weld burrs are not ejected.

A method of producing a pulley with two flanges, according to a sixth aspect of the present invention, is a method of producing a pulley with two flanges, which includes a pulley body made of a synthetic resin and a flange body that is joined to the pulley body in a male-female fitting manner and is made of a synthetic resin.

The pulley body includes: a first flange that protrudes outward in a radial direction perpendicular to a rotation axis, at a first end of the pulley body in an axial direction parallel to the rotation axis; and a fitting protrusion that has an annular shape and protrudes in the axial direction, at a second end of the pulley body in the axial direction. The flange body is positioned in the second end of the pulley body in the axial direction, has a second flange that protrudes outward in the radial direction, and has a fitting recess that is fitted to the fitting protrusion, is hollowed in the axial direction, and has an annular shape. The fitting recess has an annular inner surface including, outward in the radial direction, a first inclined surface that has a shape of a side surface of a truncated cone, the first inclined surface being inclined so as to approach the first end of the pulley body in the axial direction as extending outward in the radial direction. The fitting protrusion of the pulley body has a corner that has a circular shape and faces the first inclined surface. The flange body has an inner peripheral surface that is connected to an end portion, outward in the radial direction, of the first inclined surface, and has one of a protrusion and a recessed groove, which have no end and continue in a circumferential direction.

A method of producing a pulley with two flanges according to the sixth aspect includes: molding the pulley body through injection molding; molding the flange body through the injection molding; placing the pulley body molded so that the first flange is placed on a bottom and the axial direction corresponds to a vertical direction; placing the flange body molded on the pulley body so that the fitting recess is fitted to the fitting protrusion of the pulley body; and transmitting ultrasonic vibration of a hone of an ultrasonic welding machine to an inside of the flange body and an inside of the pulley body while pushing the flange body downward by the hone, so as to melt the corner of the pulley body mainly, thereby joining the flange body to the pulley body.

According to the method of producing a pulley with two flanges according to the sixth aspect, the fitting recess has the annular inner surface including, outward in the radial direction, the first inclined surface that has the shape of the side surface of the truncated cone. The fitting protrusion of the pulley body has the corner that has the circular shape and faces the first inclined surface. The inner peripheral surface of the flange body is connected to the end portion, outward in the radial direction, of the first inclined surface, and has one of the protrusion and the recessed groove, which have no end and continue in a circumferential direction. The protrusion or the recessed groove faces the outer peripheral surface of the fitting projection of the pulley body.

The molded flange body is placed on the pulley body so that the fitting recess is fitted to the fitting protrusion of the pulley body. The ultrasonic vibration of the hone of the ultrasonic welding machine is transmitted to the inside of the flange body and the inside of the pulley body while pushing the flange body downward by the hone, so as to melt the corner of the pulley body mainly. Accordingly, the protrusion or the recessed groove exists in a path through which the molten resin flows mainly, thereby preventing the molten resin from moving over the protrusion or the recessed groove. Therefore, if the pulley body and the flange body are joined using the ultrasonic welding machine, weld burrs are not ejected.

Advantageous Effects

As described above, according to a pulley with two flanges of the present invention and a method of producing the pulley with two flanges, no weld burr is ejected, even if a pulley body provided with one flange and a flange body provided with the other flange are joined using an ultrasonic welding machine.

BRIEF DESCRIPTION OF DRAWINGS

FIG. 3 is a vertical cross-sectional view of the pulley with two flanges shown in FIG. 1.

FIG. 9 is an explanatory view of steps of joining a flange body to a pulley body by an ultrasonic welding machine, in the pulley with two flanges according to the first embodiment.

FIG. 13 is an explanatory view of steps of joining a flange body to a pulley body by an ultrasonic welding machine, in the pulley with two flanges according to the second embodiment.

DESCRIPTION OF EMBODIMENTS

Hereinafter, embodiments of the present invention are described with reference to the accompanying drawings.

In the description, a direction parallel to a rotation axis (see a reference sign "O" in FIGS. 3 and 10) of a pulley with two flanges is referred to as an "axial direction" (see an arrow "J" in FIGS. 3 and 10), a direction perpendicular to the rotation axis is referred to as a "radial direction" (see an arrow "R" in FIGS. 3 and 10), and a "circumferential direction" (see an arrow C in FIGS. 1 and 2) is defined with respect to a direction along the rotation axis.

First Embodiment

<Pulley with Two Flanges>

Figure 1:
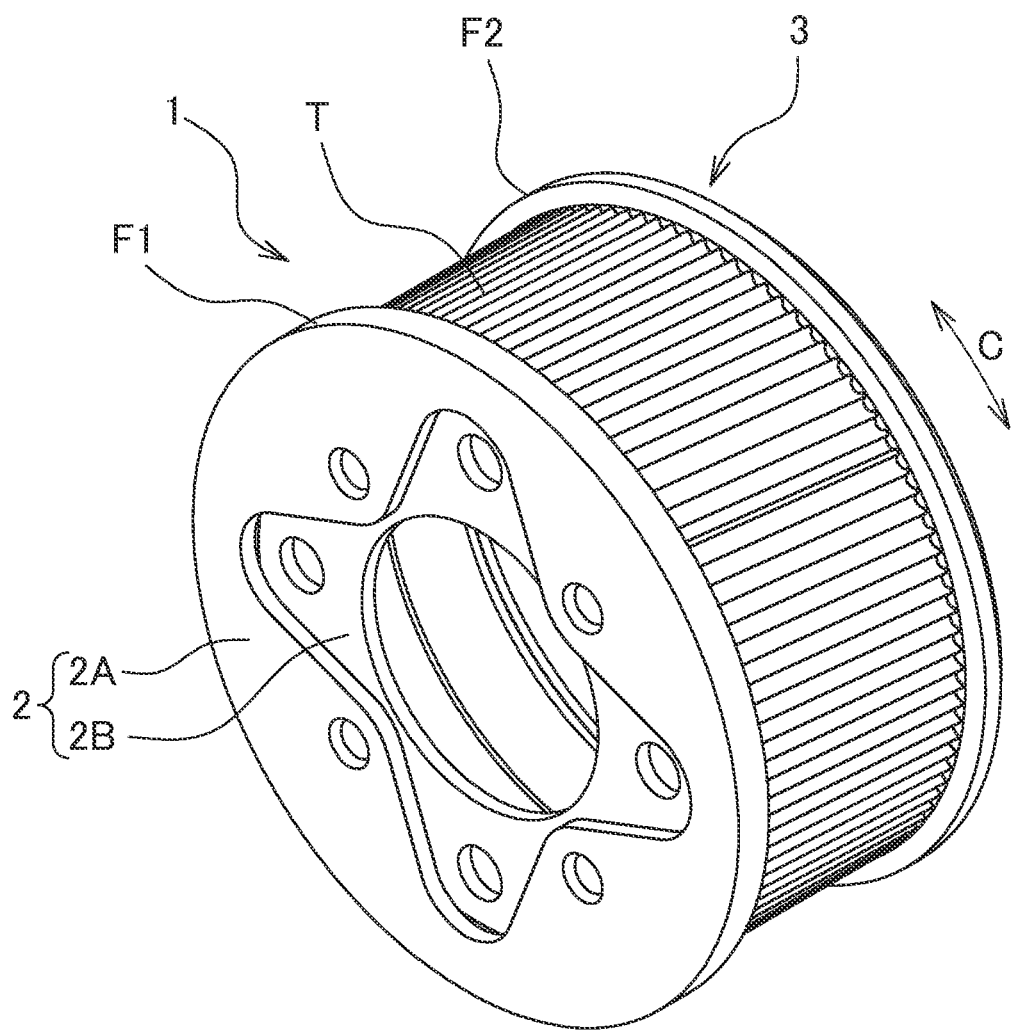
FIG. 1 is a perspective view of a pulley with two flanges according to a first embodiment of the present invention.
Figure 2:
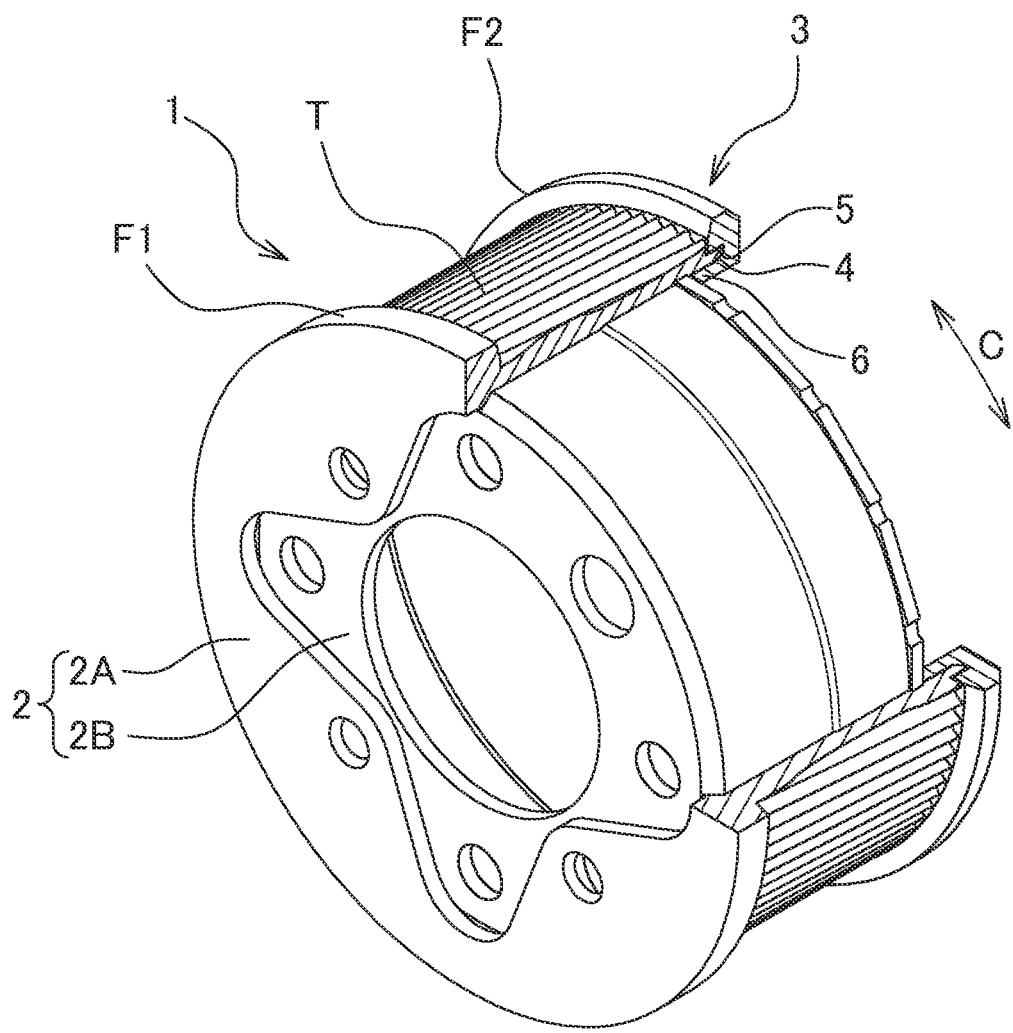
FIG. 2 is a perspective view with a partially cross-sectional view, showing the pulley with two flanges shown in FIG. 1.

A pulley 1 with two flanges according to a first embodiment of the present invention, which is shown in a perspective view of FIG. 1, a perspective view with a partially cross-sectional view of FIG. 2, and a vertical cross-sectional view of FIG. 3, is used for a power transmission mechanism of an electric power steering device, for example. The pulley 1 with two flanges includes a pulley body 2 and a flange body 3 that is joined to the pulley body 2 in a male-female fitting manner.

The pulley body 2 includes a resin part 2A and a core metal 2B. The pulley body 2 has an outer peripheral surface on which teeth T that are helical teeth are formed so as to engage with teeth of a toothed belt (not shown).

In the pulley 1 with two flanges according to the first embodiment of the present invention, a resin part 2A of the pulley body 2, which includes the teeth T, and the flange body 3 are made of a synthetic resin, thereby reducing a weight of the pulley 1 with two flanges.

<Core Metal≤

The core metal 2B has an inner peripheral surface I that is exposed. The inner peripheral surface I is attached to an outer peripheral surface of a nut member of a ball screw in a power transmission mechanism of an electric power steering device (not shown), and is used for positioning the pulley with two flanges relative to the nut member of the ball screw in a radial direction. The core metal 2B is obtained by performing press working on a cold rolled steel plate, a hot rolled steel plate, a high-tensile steel plate, and the like.

<Resin Part and Flange Body>

A material of each of the resin part 2A and the flange body 3 is a thermoplastic resin material including PBT, PA6, FA66, PA46, PPS, PEEK, or the like, for example. Among them, it is preferable that several tens percent by weight of glass fiber is combined as a reinforcing material into PPS that is excellent in thermal resistance, mechanical characteristics, fire resistant characteristics, dimensional stability, and the like.

The pulley body 2 has, at a first end J1 thereof in an axial direction J, a first flange F1 protruding in a radially outward direction RO, and an annular fitting protrusion 4 at a second end J2 in the axial direction. The annular fitting protrusion 4 layers down in a radially inward direction RI from tooth surfaces of teeth T with which a toothed belt is to engage.

Figure 4A:
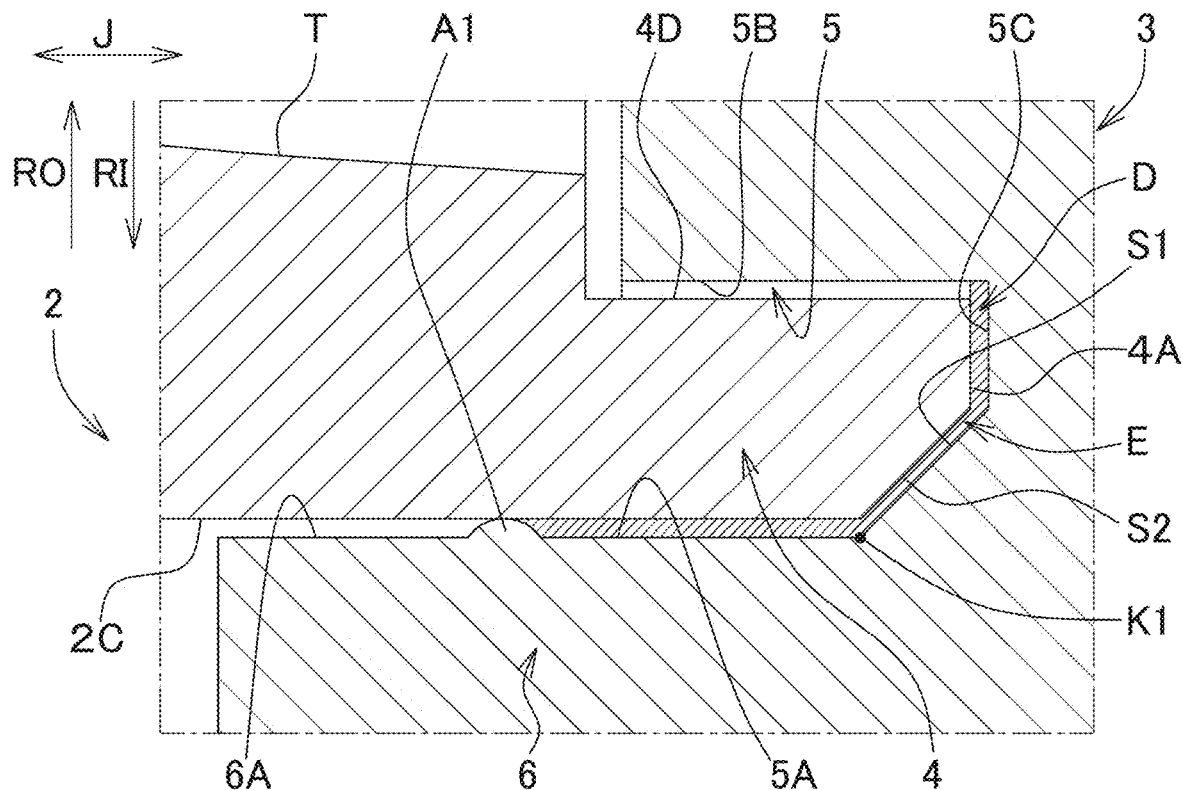
FIGS. 4A and 4B are vertical cross-sectional views of an enlarged main part of the pulley with two flanges shown in FIG. 1.
Figure 4B:
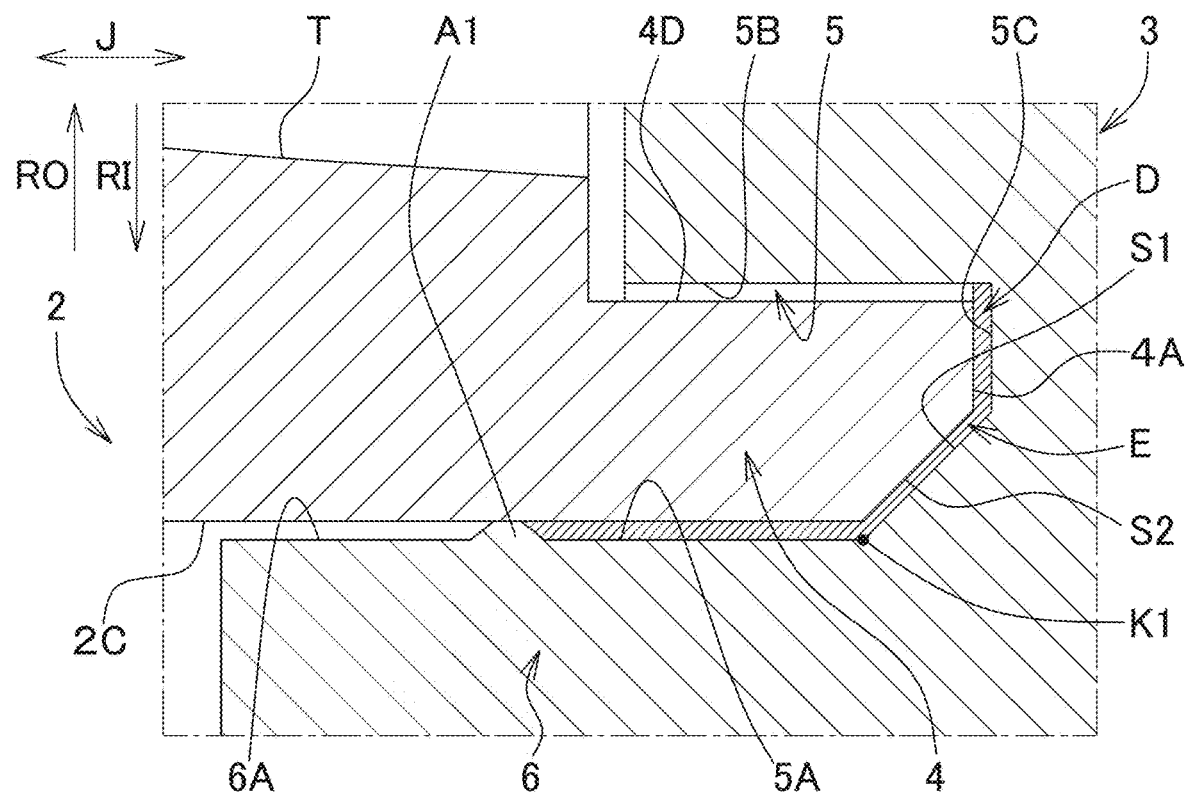

The flange body 3 is positioned at the second end J2 of the pulley body 2 in the axial direction J, and has: a second flange F2 protruding in the radially outward direction RO; an annular fitting recess 5 that is hollowed in the axial direction J to be fitted to the fitting protrusion 4; and an inward extension part 6 that is connected to an outer peripheral surface 5A serving as a circumferential wall surface of the fitting recess 5 in the radially inward direction RI (FIGS. 4A and 4B). The inward extension part 6 extends in the axial direction J along an inner peripheral surface 2C of the pulley body 2 in the radial direction.

As shown in vertical cross-sectional views of an enlarged main part of FIGS. 4A and 4B, a part, in the radially inward direction RI, of an annular inner surface 5C of the fitting recess 5 of the flange body 3 is defined as a first inclined surface S1 that has a shape of a side surface of a truncated cone, and is inclined to approach the first end J1 in the axial direction J (FIG. 3) as extending in the radially inward direction RI. A part, in the radially inward direction RI, of a distal end surface 4A of the fitting protrusion 4 of the pulley body 2 has a second inclined surface S2 that faces the first inclined surface S1.

The radially outer peripheral surface 6A of the inward extension part 6 of the flange body 3, i.e., an outer peripheral surface of the flange body 3, which faces the inner circumferential surface 2C of the pulley body 2 and is connected to an end portion K1 of the first inclined surface S1 in the radially inward direction RI, has a protrusion A1 that has no end and continues in the circumferential direction C (FIGS. 1 and 2).

The pulley 1 with two flanges has a molten-resin solid portion D that is formed through ultrasonic welding (described later) and covers a range shown in FIGS. 4A and 4B, for example. The pulley 1 with two flanges also has a joint portion E joined by the molten resin in a region including an annular-shaped area between the first inclined surface S1 and the second inclined surface S2.

Modified Example

Figure 5A:
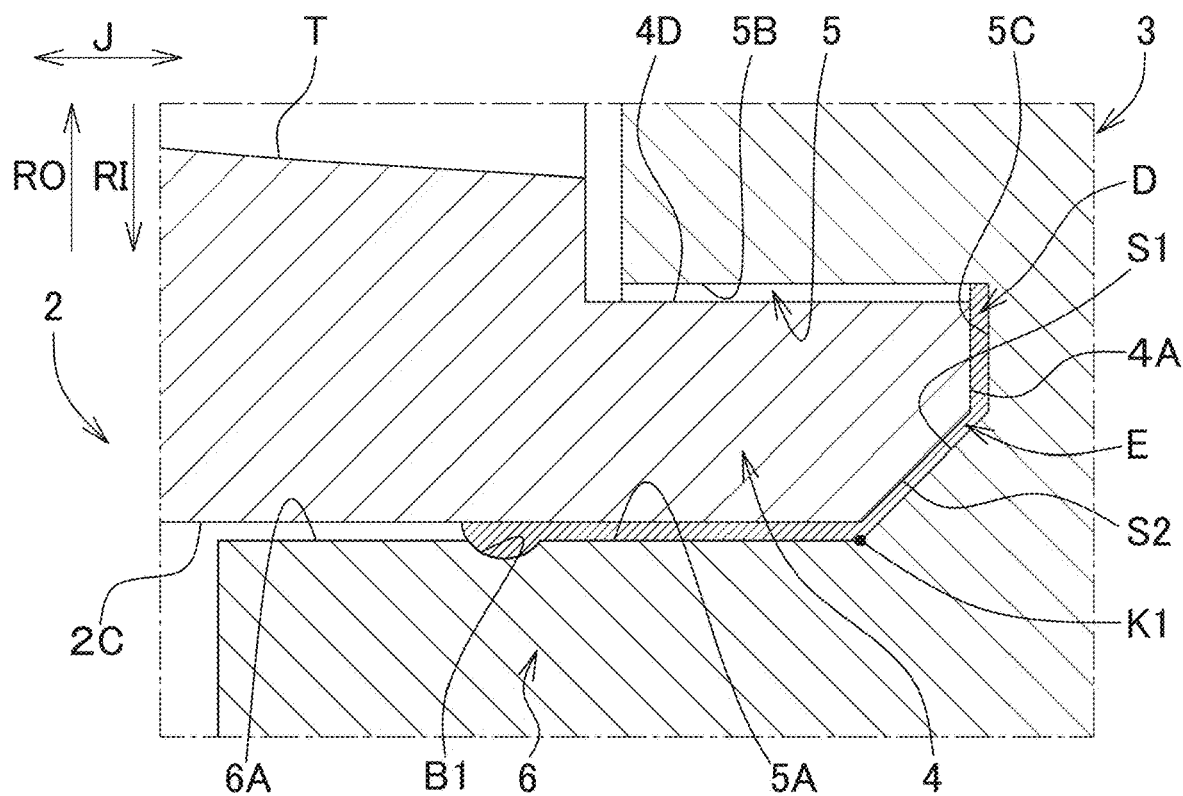
FIGS. 5A and 5B are vertical cross-sectional views of an enlarged main part, showing a first modified example.
Figure 5B:
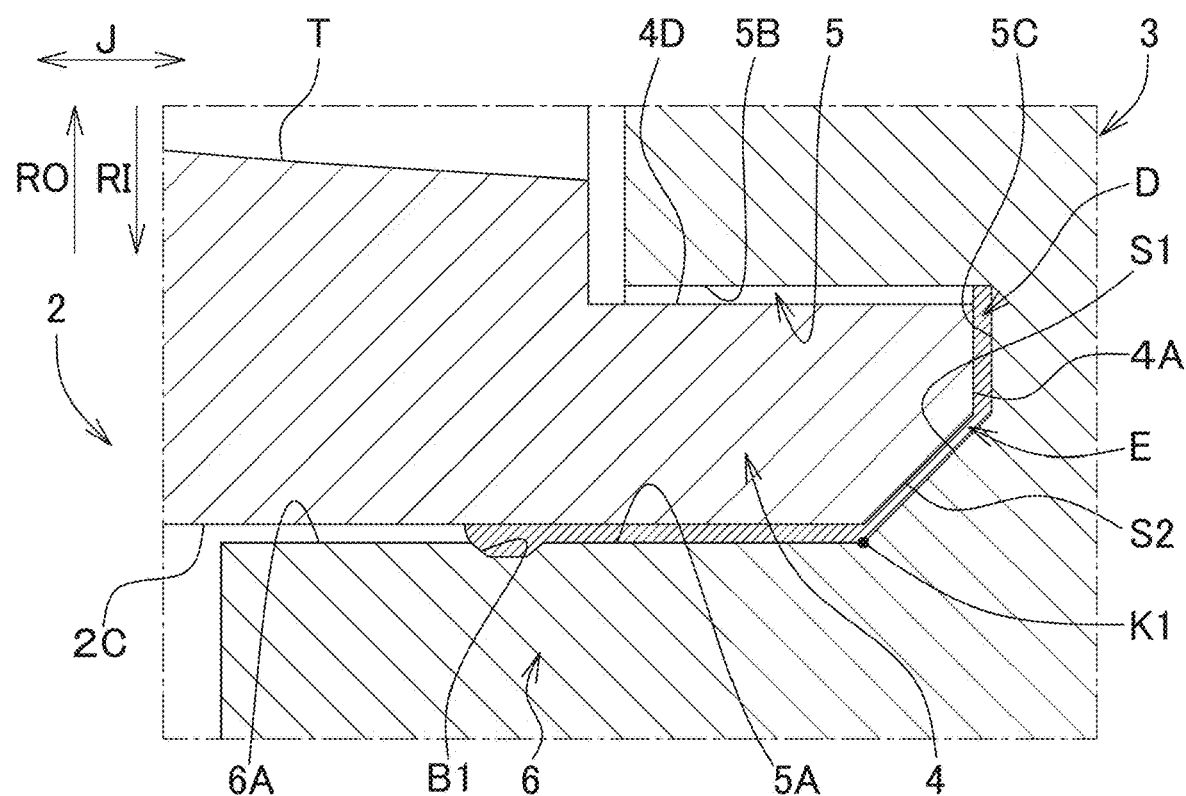

As shown in vertical cross-sectional views of an enlarged main part of FIGS. 5A and 5B, a recessed groove B1 that has no end and continues in the circumferential direction C may be provided in the radially outer peripheral surface 6A of the inward extension part 6 of the flange body 3, in place of the protrusion A1.

Figure 6A:
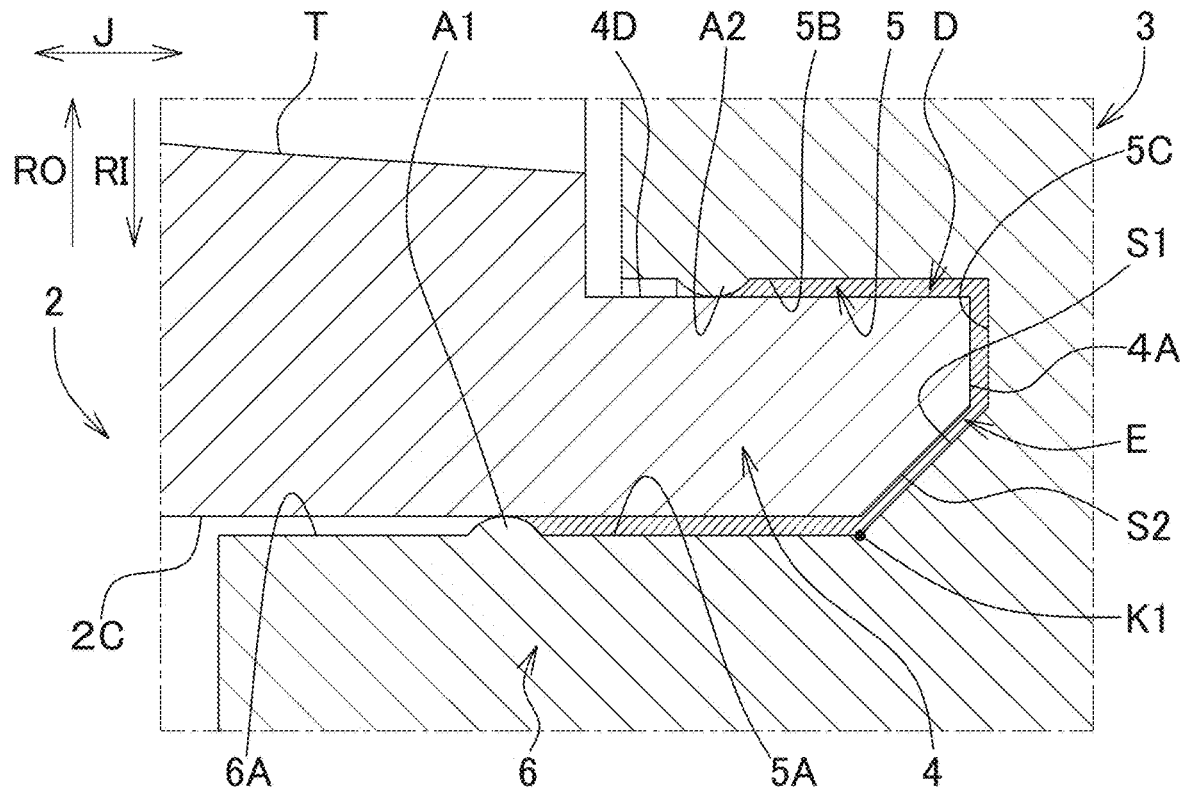
FIGS. 6A and 6B vertical cross-sectional views of an enlarged main part, showing a second modified example.
Figure 7A:
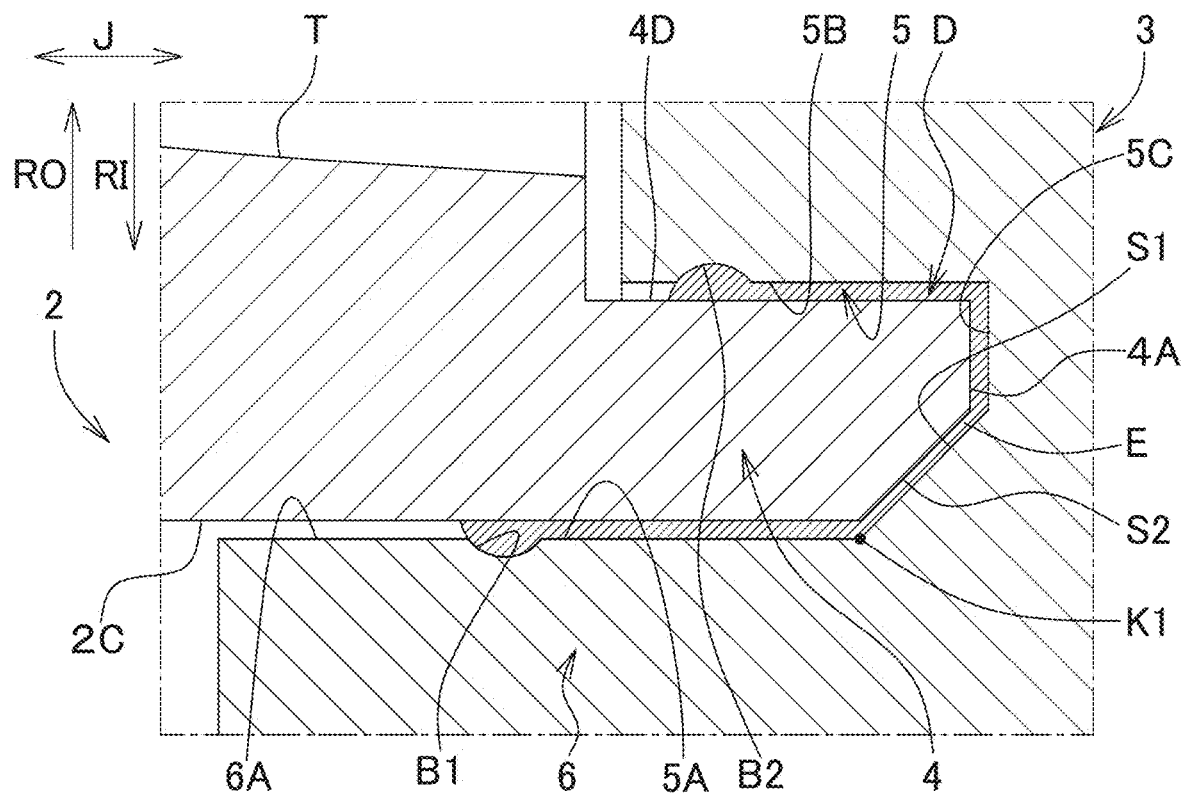
FIGS. 7A and 7B are vertical cross-sectional views of an enlarged main part, showing a third modified example.
Figure 6B:
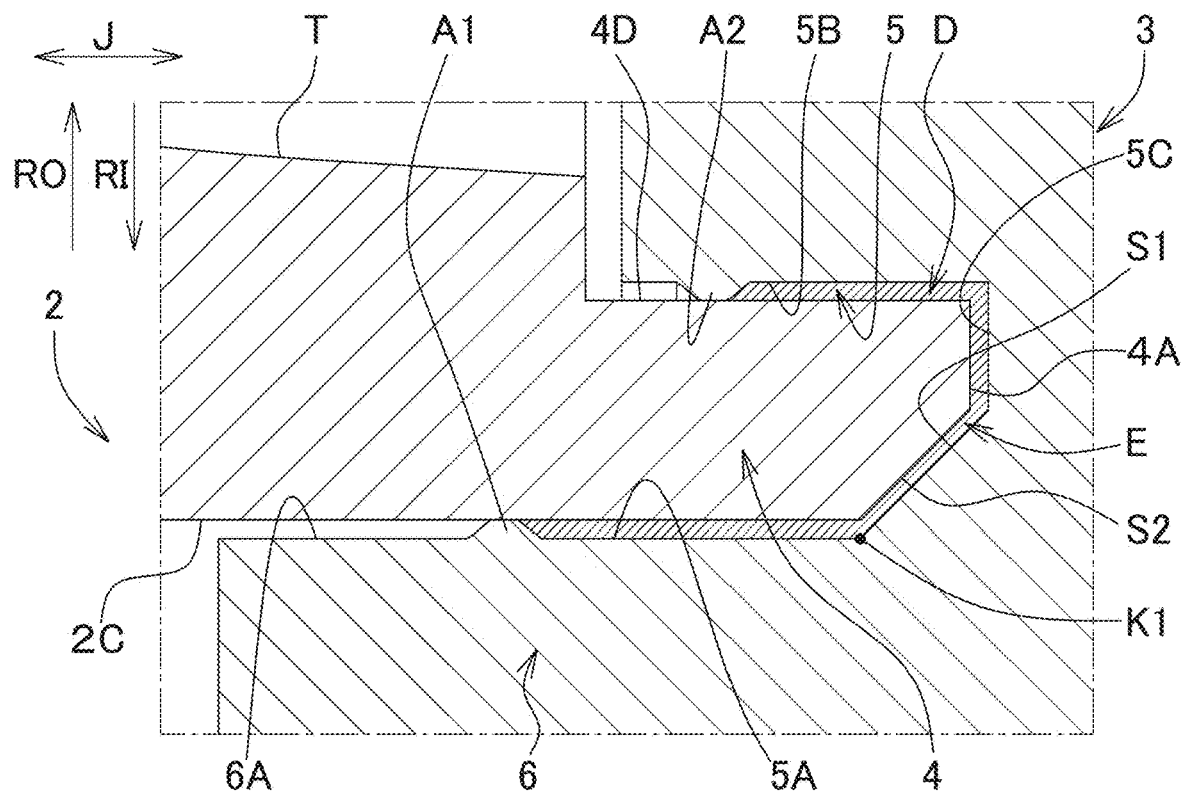
Figure 7B:
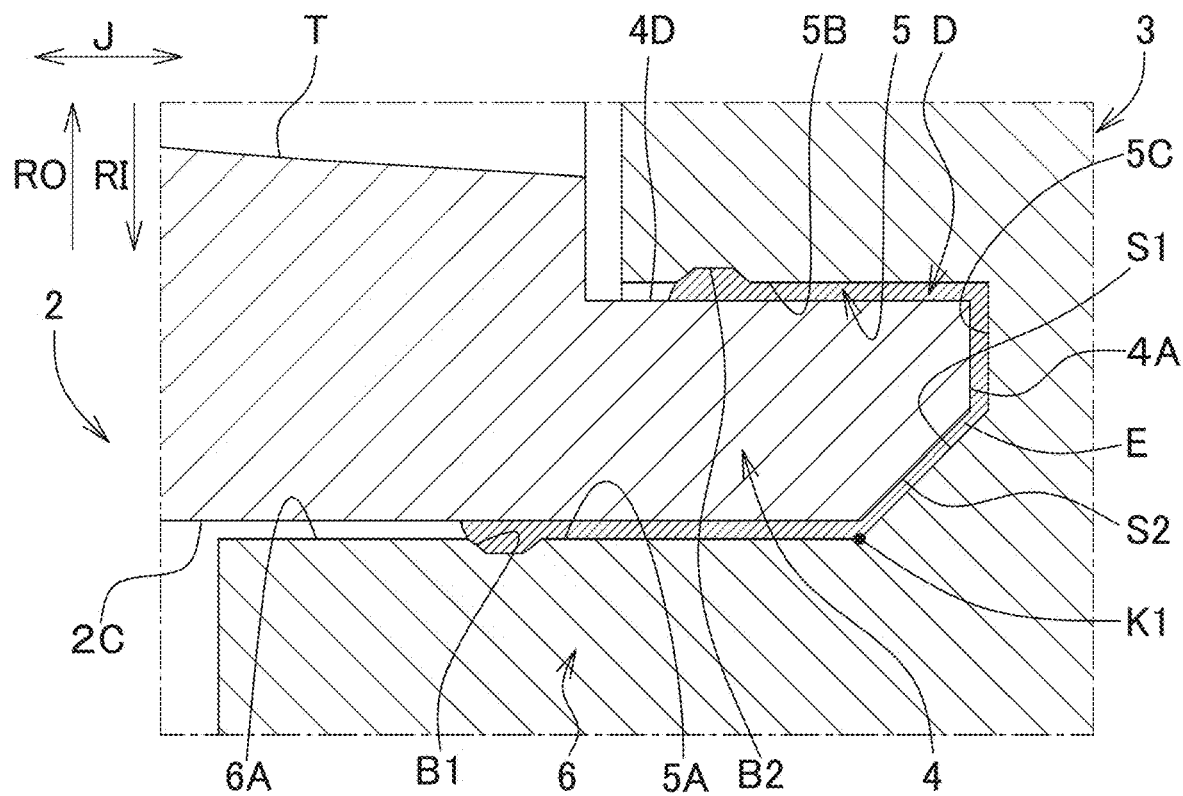

As shown in vertical cross-sectional views of an enlarged main part of FIGS. 6A and 6B, a second protrusion A2 that has no end and continues in the circumferential direction C may be provided in an inner peripheral surface 5B that is the circumferential wall surface of the fitting recess 5 in the radially outward direction RO, in addition to the protrusion A1 shown in FIGS. 4A and 4B. Furthermore, as shown in a vertical cross-sectional view of an enlarged main part of FIG. 7A, a second recessed groove B2 that has no end and continues in the circumferential direction C may be provided in the inner peripheral surface 5B, in addition to the recessed groove B1 shown in FIGS. 5A and 5B.

Figure 8:
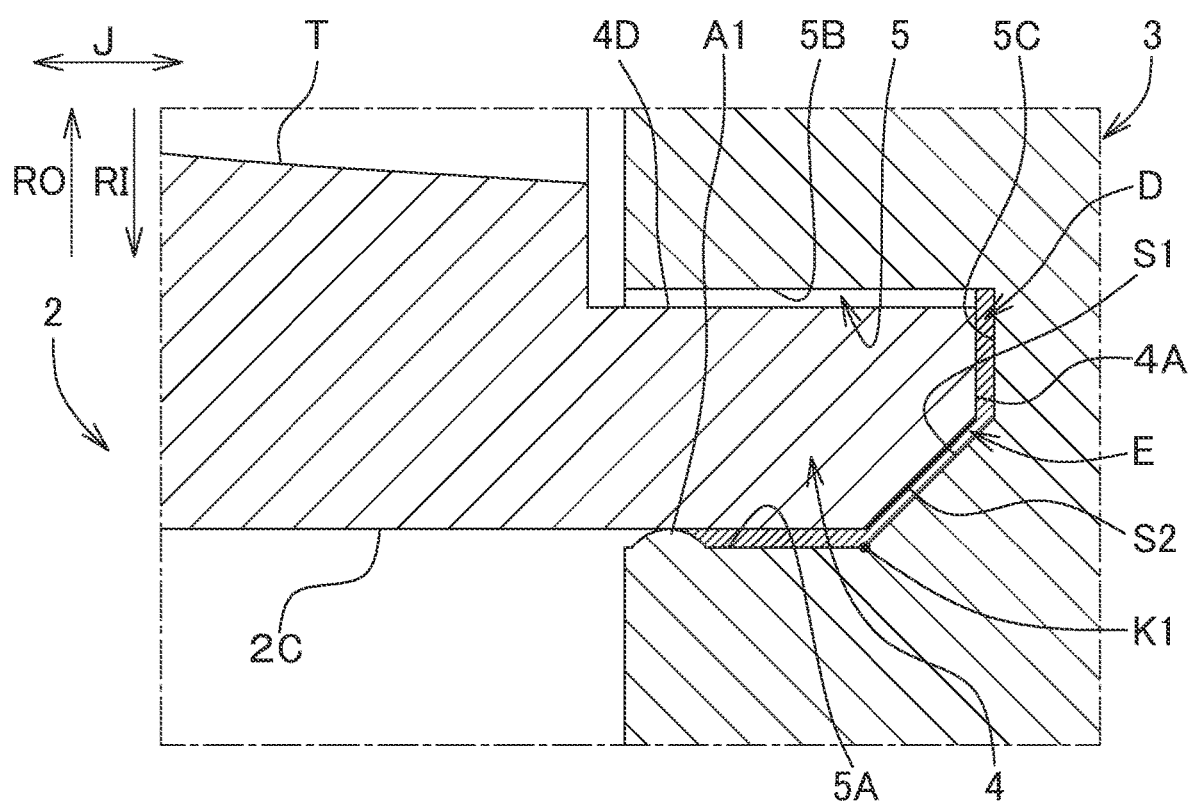
FIG. 8 is a vertical cross-sectional view of an enlarged main part, showing a fourth modified example.

If the inward extension part 6 is not provided in the flange body 3 as shown in a vertical cross-sectional view of an enlarged main part of FIG. 8, the protrusion A1 may be provided on the outer peripheral surface 5A of the flange body 3. In other words, the protrusion A1 may be provided in the outer peripheral surface of the flange body 3, which faces the inner peripheral surface 2C of the pulley body 2 and is connected to the end portion K1 of the first inclined surface S1 in the radially inward direction RI. In addition, the recessed groove B1 may be provided in the outer peripheral surface 5A.

The protrusion A1 may be provided in the outer peripheral surface 6A or the outer peripheral surface 5A, and the second recessed groove B2 may be provided in the inner peripheral surface 5B. The recessed groove B1 may be provided in the outer peripheral surface 6A or the outer peripheral surface 5A, and the second protrusion A2 may be provided in the inner peripheral surface 5B.

The protrusion A1 or the recessed groove B1 is provided, so that the protrusion A1 or the recessed groove B1 exists in a path through which a molten resin generated at the time of performing the ultrasonic welding of the pulley body 2 and the flange body 3 mainly flows. Accordingly, the molten resin can be prevented from moving over the protrusion A1 or the recessed groove B1. Therefore, even if the pulley body 2 and the flange body 3 are joined using an ultrasonic welding machine, weld burrs are not ejected.

The second protrusion A2 or the second recessed groove B2 is provided, so that the second protrusion A2 or the second recessed groove B2 exists in a path through which a molten resin flows along an outer peripheral surface 4D from the distal end surface 4A of the fitting protrusion 4 in a case where a volume of the molten resin is large upon the ultrasonic welding. Accordingly, the molten resin can be prevented from moving over the second protrusion A2 or the second recessed groove B2. Therefore, even if the pulley body 2 and the flange body 3 are joined using an ultrasonic welding machine and a volume of the molten resin is large, weld burrs are not ejected.

<Sizes and Shapes of Protrusion, Second Protrusion, Recessed Groove, and Second Recessed Groove>

A part of each of the protrusion A1 and the second protrusion A2, which corresponds to height thereof, and a part of each of the recessed groove B1 and the second recessed groove B2, which corresponds to depth thereof, may also serve as undercuts of the respective protrusion A1, second protrusion A2, recessed groove B1, and second recessed groove B2 upon injection molding. In this case, molded articles should be taken out from injection molding dies without causing deformation, crack, and scuffing to occur, according to specifications of a resin material to be used. The height of each of the protrusion A1 and the second protrusion A2, and the depth of each of the recessed groove 131 and the second recessed groove B2 are set to 0.05 mm to 0.2 mm, for example. Width (length in the axial direction J) of each of the protrusion A1, the second protrusion A2, the recessed groove B1, and the second recessed groove B2 is set to 0.5 mm to 3.0 mm, for example.

The protrusion A1 the second protrusion A2, the recessed groove S1, and the second recessed groove B2, which are to be provided in the flange body, should be shaped to have smooth surfaces so that a stress applied at forcible extraction of the molded flange body 3 from the injection molding die is reduced. For example, it is preferable that cross sections of the protrusions and grooves, which are cut by a plane including a rotation axis O, have an arc shape. Alternatively, the cross sections may be a trapezoid.

<Method of Producing Pulley with Two Flanges>

The pulley 1 with two flanges according to the first embodiment is produced as follows. An example of producing the pulley 1 with two flanges shown in FIGS. 1 to 4B is described.

(1) Steps of Molding Pulley Body 2

A pulley body 2 before joined by the flange body 3 has a fitting protrusion 4, the shape of which is different from that of the pulley body 2 shown in FIGS. 1 to 4B. Specifically, an end, in the radially inward direction RI, of the distal end surface 4A of the fitting protrusion 4 has a corner 4B having a circular shape, as shown in an upper cross-sectional view in FIG. 9.

An injection molding die for molding such a pulley body 2 having the shape before being joined by the flange body 3 is opened, the core metal 2B is set as an insert work, and the molding die is closed and clamped. In this state, a synthetic resin material that has been molten is injected in the molding die. The molding die is opened after the material is cooled and solidified, and the solidified material is stuck by an ejector pin. Thus, the pulley body 2 with the fitting protrusion 4 having a shape shown in the upper cross-sectional view in FIG. 9 is molded. In this pulley body 2, the resin part 2A and the core metal 2B are unified.

(2) Steps of Molding Flange Body 3

An injection molding die for molding the flange body 3 having a shape shown in FIGS. 1 to 3 is closed and clamped. In this state, a synthetic resin material that has been molten is injected in the molding die. The molding die is opened after the material is cooled and solidified, and the solidified material is stuck by an ejector pin. Thus, the flange body 3 having a shape shown in FIGS. 1 to 3 is molded.

(3) Steps of Joining Pulley Body 2 and Flange Body 3

Steps of joining the flange body 3 to the pulley body 2 by an ultrasonic welding machine G are described with reference to an explanatory view of FIG. 9.

The pulley body 2 that has been molded and has the shape before being joined by the flange body 3 is placed so that the fitting protrusion 4 faces upward with the first flange F1 being placed on the bottom and the axial direction J corresponds to a vertical direction.

Then, the flange body 3 that has been molded is placed on the pulley body 2 so that the fitting recess 5 is fitted to the fitting protrusion 4 of the pulley body 2. The circular-shaped corner 413 of the fitting protrusion 4 of the pulley body 2 is in contact with the first inclined surface S1 that has a shape of a side surface of the truncated cone of the fitting recess 5 of the flange body 3.

Then, the flange body 3 is pushed downward by a hone H of the ultrasonic welding machine G as indicated by an arrow P, and at the same time, ultrasonic vibration of the hone H is transmitted to an inside of the flange body 3 and an inside of the pulley body 2 to generate frictional heat, thereby melting the circular-shaped corner 4B of the pulley body 2 mainly (from (a) to (b) of FIG. 9).

The corner 4B of the pulley body 2 in the radially inward direction RI is mainly melted, so that the molten resin easily flows downward from the end portion K1, in the radially inward direction RI, of the first inclined surface S1 that has a shape of the side surface of the truncated cone, as shown in (b) of FIG. 9. The protrusion A1 that has no end and continues in the circumferential direction C is provided in the outer peripheral surface of the flange body 3 (the outer peripheral surface 6A of the inward extension part 6). The outer peripheral surface is connected to the end portion K1 of the first inclined surface S1 in the radially inward direction RI. Accordingly, the molten resin is inhibited from flowing downward over the protrusion A1.

If the recessed groove B1 is provided as shown in FIGS. 5A and 5B, instead of the protrusion A1, the molten resin enters the recessed groove B1 and the resin stays in the recessed groove B1 that continues in the circumferential direction C with no end. Thus, it becomes difficult for the molten resin to flow downward over the recessed groove B1.

When the ultrasonic vibration by the hone H is stopped, a temperature of the molten resin decreases, and the molten resin is solidified. This causes a second inclined surface S2 that faces the first inclined surface S1 to be formed at a part of the distal end surface 4A of the fitting protrusion 4 in the radially inward direction RI, and also causes a solidified portion D of the molten resin to be formed, as shown in (b) of FIG. 9. The region including the annular-shaped area between the first inclined surface S1 and the second inclined surface S2 is joined, thereby providing a joint portion E of the molten resin.

In the pulley 1 with two flanges, which is produced by the method of producing the pulley 1 with two flanges, the protrusion A1 or the recessed groove B1 is provided in the path through which the molten resin mainly flows at joining the flange body 3 to the pulley body 2 by the ultrasonic welding machine G. Accordingly, the molten resin can be prevented from moving over the protrusion A1 or the recessed groove B1. Therefore, even if the pulley body 2 and the flange body 3 are joined using the ultrasonic welding machine G, weld burrs are not ejected.

Second Embodiment

Figure 10:
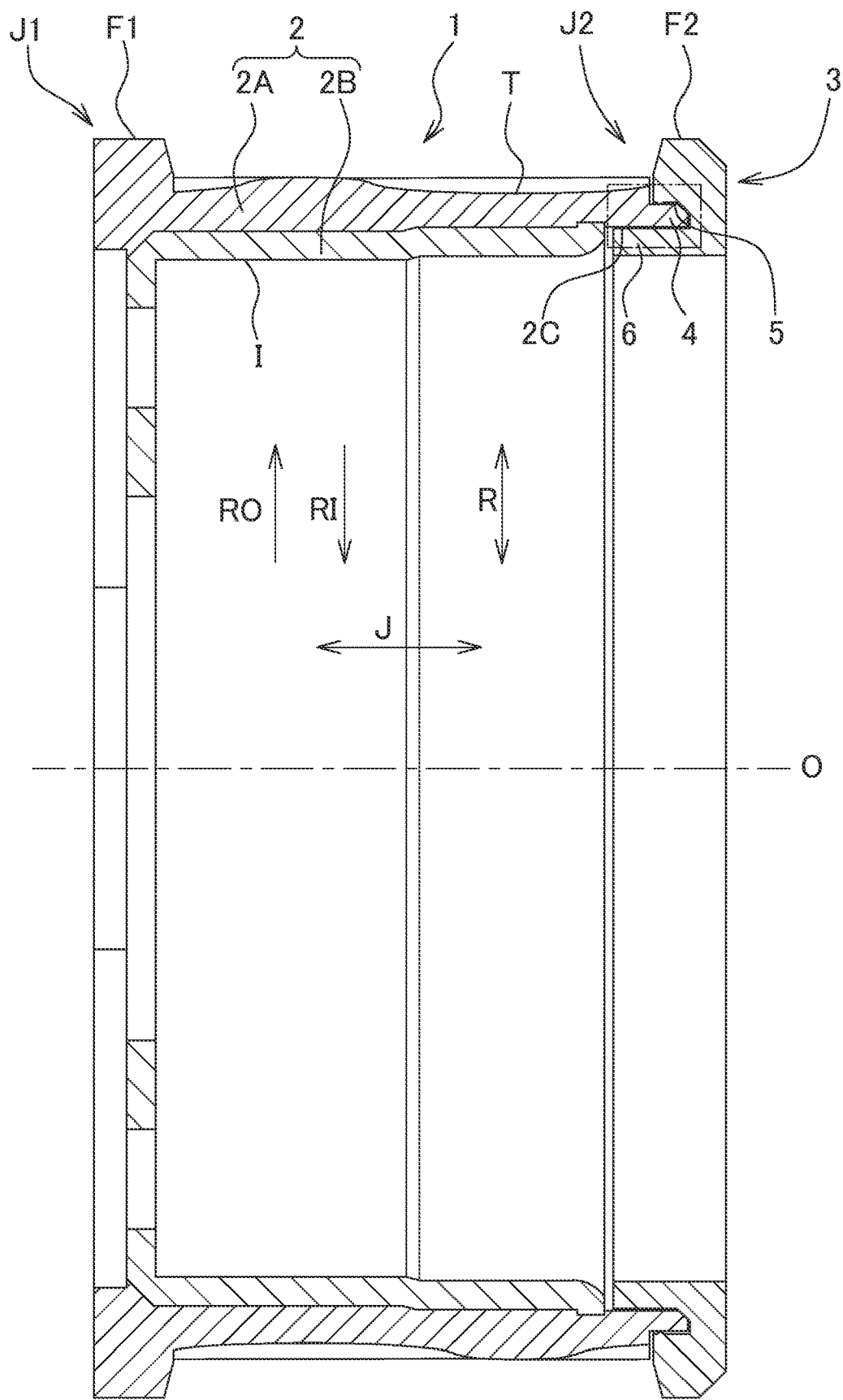
FIG. 10 is a vertical cross-sectional view of a pulley with two flanges according to a second embodiment of the present invention.
Figure 11:
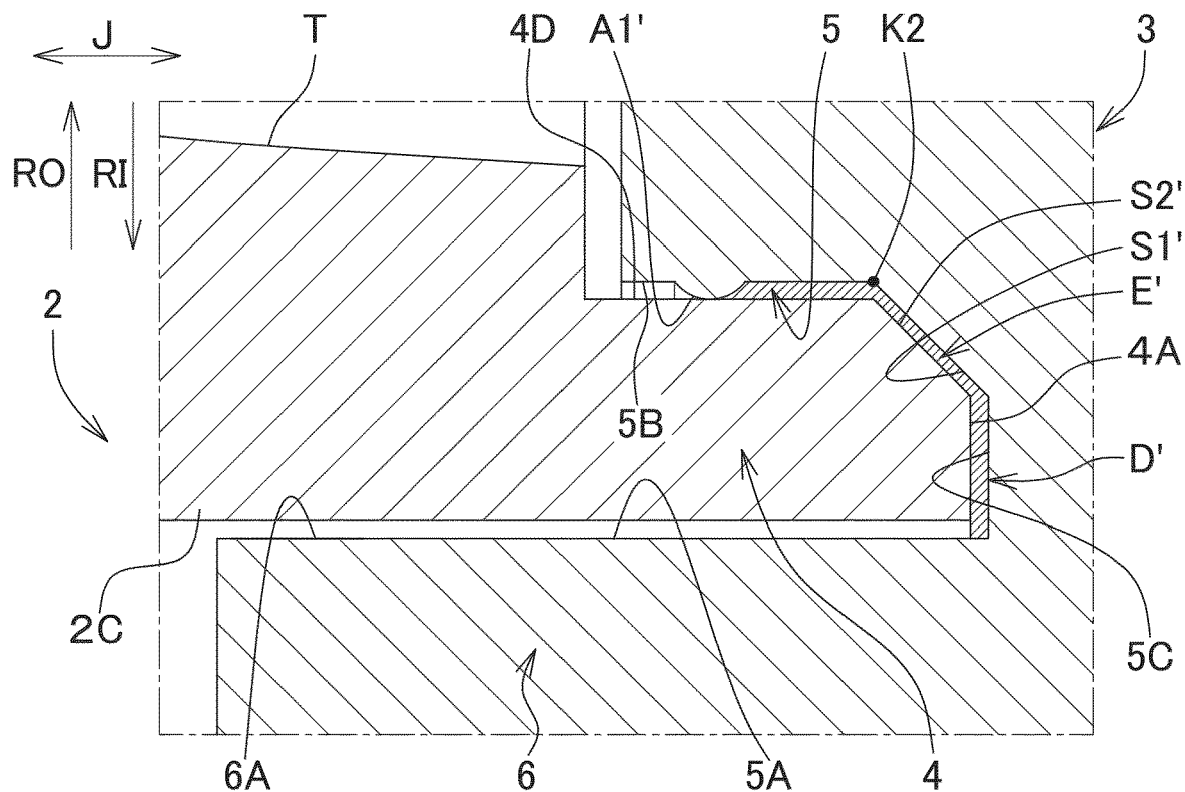
FIG. 11 is a vertical cross-sectional view of an enlarged main part of the pulley with two flanges shown in FIG. 10.

A pulley 1 with two flanges according to a second embodiment of the present invention, which is shown in a vertical cross-sectional view of FIG. 10 and a vertical cross-sectional view of an enlarged main part of FIG. 11, is different, in first and second inclined surfaces S1 and S2 and a position of a protrusion A1, from the pulley 1 with two flanges according to the first embodiment, which is shown in the vertical cross-sectional view of FIG. 3 and the vertical cross-sectional views of the enlarged main part of FIGS. 4A and 4B.

In the second embodiment, a part, in the radially outward direction RO, of an annular inner surface 5C of a fitting recess 5 of a flange body 3 is defined as a first inclined surface S1' that has a shape of a side surface of a truncated cone inclined so as to approach the first end J1 in the axial direction J as extending in the radially outward direction RO. In addition, a part, in the radially outward direction RO, of a distal end surface 4A of a fitting protrusion 4 of a pulley body 2 has a second inclined surface S2' that faces the first inclined surface S1'. An inner peripheral surface 5B of the flange body 3, which is connected to an end portion K2 of the first inclined surface S1' in the radially outward direction RO and faces an outer peripheral surface 4D of the fitting protrusion 4 of the pulley body 2, has a protrusion A1' that has no end and continues in the circumferential direction C.

The pulley 1 with two flanges has a molten-resin solidified portion D' that is formed through ultrasonic welding (described later) and covers a range shown in FIG. 11, for example. The pulley 1 with two flanges also has a joint portion E' joined by the molten resin in a region including an annular-shaped area between the first inclined surface S1' and the second inclined surface S2'.

Modified Example

Figure 12:
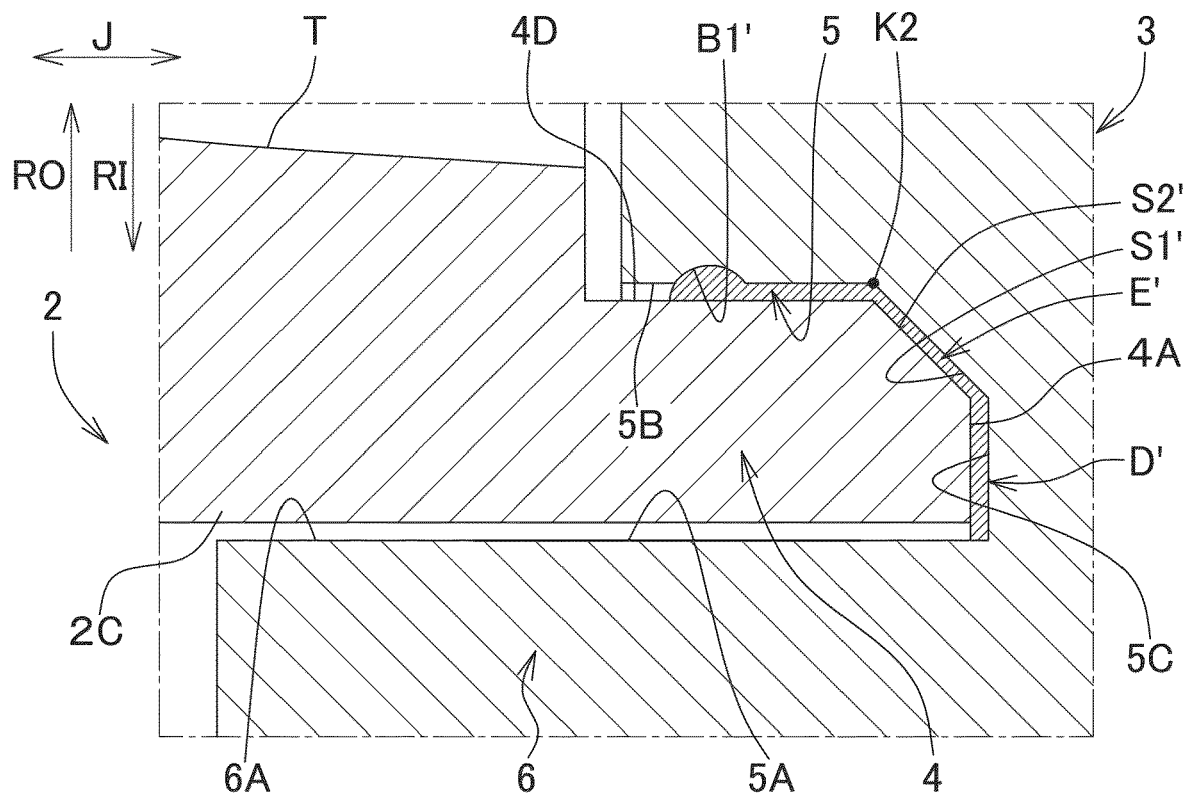
FIG. 12 is a vertical cross-sectional view of an enlarged main part, showing a fifth modified example.

As shown in a vertical cross-sectional view of an enlarged main part of FIG. 12, a recessed groove B1' that has no end and continues in the circumferential direction C may be provided in an inner peripheral surface 5B of the flange body 3, in place of the protrusion A1'.

In the second embodiment, a second protrusion A2' or a second recessed groove B2' may also be provided in addition to the protrusion A1' shown in FIG. 11 or the recessed groove B1' in FIG. 12, similar to the first embodiment. In other words, the second protrusion A2' or the second recessed groove B2' which has no end and continues in the circumferential direction C may be provided in each of the outer peripheral surfaces 6A and 5A of the flange body 3 facing an inner peripheral surface 2C of the pulley body 2.

The protrusion A1' or the recessed groove B1' is provided, so that the protrusion A1' or the recessed groove B1' exists in a path through which a molten resin generated when performing ultrasonic welding of the pulley body 2 and the flange body 3 mainly flows. Accordingly, the molten resin can be prevented from moving over the protrusion A1' or the recessed groove B1'. Therefore, even if the pulley body 2 and the flange body 3 are joined using an ultrasonic welding machine, weld burrs are not ejected.

The second protrusion A2' or the second recessed groove B2' is provided, so that the second protrusion A2' or the second recessed groove B2' exists in a path through which a molten resin flows along the inner peripheral surface 2C from the distal end surface 4A of the fitting protrusion 4 when a volume of the molten resin at the ultrasonic welding is large. Accordingly, the molten resin can be prevented from moving over the second protrusion A2' or the second recessed groove B2'. Therefore, even if the pulley body 2 and the flange body 3 are joined using an ultrasonic welding machine and a volume of the molten resin is large, weld burrs are not ejected.

<Method of Producing Pulley with Two Flanges>

The pulley 1 with two flanges according to the second embodiment is produced as follows. An example of producing the pulley 1 with two flanges shown in FIG. 11 is described.

(1) Steps of Molding Pulley Body 2

A pulley body 2 before joined by the flange body 3 has a fitting protrusion 4, the shape of which is different from that of the pulley body 2 shown in FIG. 11. Specifically, an end in the radially outward direction RG of the distal end surface 4A of the fitting protrusion 4 has a corner 40 having a circular shape, as shown in an upper cross-sectional view in FIG. 13.

An injection molding die for molding such a pulley body 2 having a shape before being joined by the flange body 3 is opened, a core metal 2B is set as an insert work, and the molding die is closed and clamped. In this state, a synthetic resin material that has been molten is injected in the molding die. The molding die is opened after the material is cooled and solidified, and the solidified material is stuck by an ejector pin. Thus, the pulley body 2 with the fitting protrusion 4 having a shape shown in the upper cross-sectional view in FIG. 13 is molded. In this pulley body 2, the resin part 2A and the core metal 2B are unified.

(2) Steps of Molding Flange Body 3

An injection molding die for molding the flange body 3 having a shape shown in FIG. 10 is closed and clamped. In this state, a synthetic resin material that has been molten is injected in the molding die. The molding die is opened after the material is cooled and solidified, and the solidified material is stuck by an ejector pin. Thus, the flange body 3 having the shape shown in FIG. 10 is molded.

(3) Steps of Joining Pulley Body 2 and Flange Body 3

Steps of joining the flange body 3 to the pulley body 2 by the ultrasonic welding machine G are described with reference to an explanatory view of FIG. 13.

The pulley body 2 that has been molded and has a shape before being joined by the flange body 3 is placed so that the fitting protrusion 4 faces upward with the first flange F1 being placed on the bottom and the axial direction J corresponds to a vertical direction.

Then, the flange body 3 that has been molded is placed on the pulley body 2 so that the fitting recess 5 is fitted to the fitting protrusion 4 of the pulley body 2. The circular-shaped corner 4C of the fitting protrusion 4 of the pulley body 2 is in contact with the first inclined surface S1' that has a shape of the side surface of the truncated cone of the fitting recess 5 of the flange body 3.

Then, the flange body 3 is pushed downward by a hone H of the ultrasonic welding machine G as indicated by an arrow Q, and at the same time, ultrasonic vibration by the hone H is transmitted to an inside of the flange body 3 and an inside of the pulley body 2 to generate frictional heat, thereby melting the circular-shaped corner 4C of the pulley body 2 mainly (from (a) to (b) of FIG. 13).

The corner 4C of the pulley body 2 in the radially outward direction RO is mainly melted, so that the molten resin easily flows downward from the end portion K2, in the radially outward direction RO, of the first inclined surface S1' that has a shape of the side surface of the truncated cone, as shown in (b) of FIG. 13. The protrusion A1' that has no end and continues in the circumferential direction C is provided in the inner peripheral surface 5B of flange body 3, which is connected to the end portion K2 of the first inclined surface S1' in the radially outward direction RO. Accordingly, the molten resin is inhibited from flowing downward over the protrusion A12.

If the recessed groove B1' is provided as shown in FIG. 12, instead of the protrusion A1', the melted resin enters the recessed groove B1' and the resin stays in the recessed groove B1' that continues in the circumferential direction C with no end. Thus, it becomes difficult for the molten resin to flow downward over the recessed groove B1'.

When the ultrasonic vibration by the hone H is stopped, a temperature of the molten resin decreases, and the molten resin is solidified. This causes a second inclined surface S2' that faces the first inclined surface S1' to be formed at a part of the distal end surface 4A of the fitting protrusion 4 in the radially outward direction RO, and also causes a solidified portion D' of the molten resin to be formed, as shown in (b) of FIG. 13. The region including an annular-shaped area between the first inclined surface S1' and the second inclined surface S2' is joined, thereby providing a joint portion E of the molten resin.

In the pulley 1 with two flanges, which is produced by the method of producing the pulley 1 with two flanges, the protrusion A1' or the recessed groove B1' is provided in the path through which the molten resin mainly flows at joining the flange body 3 to the pulley body 2 by the ultrasonic welding machine G. Accordingly, the molten resin can be prevented from moving over the protrusion A1' or the recessed groove B12. Therefore, even if the pulley body 2 and the flange body 3 are joined using the ultrasonic welding machine G, weld burrs are not ejected.

In the above description, the first inclined surface S1' is located in a radially inward side indicated by the direction RI of the annular inner surface 5C of the fitting recess 5 in the first embodiment, and the first inclined surface S1' is located in a radially outward side indicated by the direction RO of the annular inner surface 5C of the fitting recess 5 in the second embodiment. The first inclined surface S1' may be provided in both the radially inward side indicated by the direction RI and the radially outward side indicated by the direction RO of the annular inner surface 5C of the fitting recess 5. In the pulley 1 with two flanges in this case, the second inclined surface S2' of the distal end surface 4A of the fitting protrusion 4 is also provided in both the radially inward side indicated by the direction RI and the radially outward side indicated by the direction RO so as to face the first inclined surfaces S1' located in both the radially inward side indicated by the direction RI and the radially outward side indicated by the direction RO.

The above description of the embodiments are all examples, and thus the present invention is not limited thereto. Various improvements and modifications without departing from the scope of the present invention can be applied.

The invention claimed is:

1. A pulley with two flanges comprising:
a pulley body; and
a flange body joined to the pulley body in a male-female fitting manner; wherein
the pulley body includes:
    a first flange that protrudes outward in a radial direction perpendicular to a rotation axis, at a first end of the pulley body in an axial direction parallel to the rotation axis; and
    a fitting protrusion that has an annular shape and protrudes in the axial direction, at a second end of the pulley body in the axial direction;
wherein the flange body:
is positioned in the second end of the pulley body in the axial direction;
has a second flange that protrudes outward in the radial direction; and
has a fitting recess that is fitted to the fitting protrusion, is hollowed in the axial direction, and has an annular shape,
the fitting recess has an annular inner surface including, inward in the radial direction, a first inclined surface that has a shape of a side surface of a truncated cone, the first inclined surface being inclined so as to approach the first end of the pulley body in the axial direction as extending inward in the radial direction,
the fitting protrusion has a distal end surface including, inward in the radial direction, a second inclined surface that faces the first inclined surface,
the flange body has an outer peripheral surface that: is connected to an end portion, inward in the radial direction, of the first inclined surface; and faces an inner peripheral surface of the pulley body, the outer peripheral surface serving as a circumferential wall surface of the fitting recess and having one of a protrusion and a recessed groove, which has no end and continues in a circumferential direction, and a region including an annular-shaped area between the first inclined surface and the second inclined surface includes a joint portion of a molten resin, which is prevented from moving past the protrusion or the recessed groove, such that when the pulley body and flange body are joined together, weld burrs are prevented from being ejected by one of the protrusion and the recessed groove,
wherein the cross-section of each of the protrusion and the recessed groove, cut by a plane including a rotation axis, is one of an arc-shape and a trapezoid, the trapezoid having two non-parallel opposing sides.

2. A pulley with two flanges comprising:
a pulley body, and
a flange body joined to the pulley body in a male-female fitting manner; wherein
the pulley body includes:
    a first flange that protrudes outward in a radial direction perpendicular to a rotation axis, at a first end of the pulley body in an axial direction parallel to the rotation axis; and
    a fitting protrusion that has an annular shape and protrudes in the axial direction, at a second end of the pulley body in the axial direction;
wherein the flange body:
is positioned in the second end of the pulley body in the axial direction;
has a second flange that protrudes outward in the radial direction; and
has a fitting recess that is fitted to the fitting protrusion, is hollowed in the axial direction, and has an annular shape,
the fitting recess has an annular inner surface including, outward in the radial direction, a first inclined surface that has a shape of a side surface of a truncated cone, the first inclined surface being inclined so as to approach the first end of the pulley body in the axial direction as extending outward in the radial direction,
the fitting protrusion has a distal end surface including, outward in the radial direction, a second inclined surface that faces the first inclined surface,
the flange body has an inner peripheral surface that: is connected to an end portion, outward in the radial direction, of the first inclined surface; and faces an outer peripheral surface of the fitting protrusion of the pulley body, the inner peripheral surface serving as a circumferential wall surface of the fitting recess and having one of a protrusion and a recessed groove, which has no end and continues in a circumferential direction, and a region including an annular-shaped area between the first inclined surface and the second inclined surface includes a joint portion of a molten resin, which is prevented from moving past the protrusion or the recessed groove, such that when the pulley body and flange body are joined together, weld burrs are prevented from being ejected by one of the protrusion and the recessed groove, wherein the cross-section of each of the protrusion and the recessed groove, cut by a plane including a rotation axis, is one of an arc-shape and a trapezoid, the trapezoid having two non-parallel opposing sides.

3. The pulley with two flanges according to claim 1, wherein the flange body has an inner peripheral surface that is provided with one of a second protrusion and a second recessed groove, which has no end and continues in the circumferential direction, the inner peripheral surface facing an outer peripheral surface of the fitting protrusion of the pulley body.

4. The pulley with two flanges according to claim 2, wherein the flange body has an outer peripheral surface that is provided with one of a second protrusion and a second recessed groove, which has no end and continues in the circumferential direction, the outer peripheral surface facing an inner peripheral surface of the pulley body.

5. A method of producing a pulley with two flanges, the pulley including a pulley body made of a synthetic resin and a flange body that is joined to the pulley body in a male-female fitting manner and is made of a synthetic resin, wherein the pulley body includes:
a first flange that protrudes outward in a radial direction perpendicular to a rotation axis, at a first end of the pulley body in an axial direction parallel to the rotation axis; and
a fitting protrusion that has an annular shape and protrudes in the axial direction, at a second end of the pulley body in the axial direction, the flange body:
is positioned in the second end of the pulley body in the axial direction;
has a second flange that protrudes outward in the radial direction; and
has a fitting recess that is fitted to the fitting protrusion, is hollowed in the axial direction, and has an annular shape,
the fitting recess has an annular inner surface including, inward in the radial direction, a first inclined surface that has a shape of a side surface of a truncated cone, the first inclined surface being inclined so as to approach the first end of the pulley body in the axial direction as extending inward in the radial direction,
the fitting protrusion has a distal end surface including, inward in the radial direction, a second inclined surface that faces the first inclined surface,
the flange body has an outer peripheral surface that: is connected to an end portion, inward in the radial direction, of the first inclined surface; and faces an inner peripheral surface of the pulley body, the outer peripheral surface serving as a circumferential wall surface of the fitting recess and having one of a protrusion and a recessed groove, which has no end and continues in a circumferential direction, and a region including an annular-shaped area between the first inclined surface and the second inclined surface includes a joint portion of a molten resin, which is prevented from moving past the protrusion or the recessed groove, such that when the pulley body and flange body are joined together, weld burrs are prevented from being ejected by one of the protrusion and the recessed groove, wherein the cross-section of each of the protrusion and the recessed groove, cut by a plane including a rotation axis, is one of an arc-shape and a trapezoid, the trapezoid having two non-parallel opposing sides, the method comprising:

molding the pulley body through injection molding;
molding the flange body through the injection molding;
placing the pulley body molded so that the first flange is placed on a bottom and the axial direction corresponds to a vertical direction;
placing the flange body molded on the pulley body so that the fitting recess is fitted to the fitting protrusion of the pulley body; and
transmitting ultrasonic vibration of a hone of an ultrasonic welding machine to an inside of the flange body and an inside of the pulley body while pushing the flange body downward by the hone, so as to melt the corner of the pulley body mainly, thereby joining the flange body to the pulley body.

6. A method of producing a pulley with two flanges, the pulley including a pulley body made of a synthetic resin and a flange body that is joined to the pulley body in a male-female fitting manner and is made of a synthetic resin, wherein the pulley body includes:
a first flange that protrudes outward in a radial direction perpendicular to a rotation axis, at a first end of the pulley body in an axial direction parallel to the rotation axis; and
a fitting protrusion that has an annular shape and protrudes in the axial direction, at a second end of the pulley body in the axial direction,
the flange body:
is positioned in the second end of the pulley body in the axial direction;
has a second flange that protrudes outward in the radial direction; and
has a fitting recess that is fitted to the fitting protrusion, is hollowed in the axial direction, and has an annular shape,
the fitting recess has an annular inner surface including, outward in the radial direction, a first inclined surface that has a shape of a side surface of a truncated cone, the first inclined surface being inclined so as to approach the first end of the pulley body in the axial direction as extending outward in the radial direction,
the fitting protrusion has a distal end surface including, outward in the radial direction, a second inclined surface that faces the first inclined surface,
the flange body has an inner peripheral surface that: is connected to an end portion, outward in the radial direction, of the first inclined surface; and faces an outer peripheral surface of the fitting protrusion of the pulley body, the inner peripheral surface serving as a circumferential wall surface of the fitting recess and having one of a protrusion and a recessed groove, which has no end and continues in a circumferential direction, and a region including an annular-shaped area between the first inclined surface and the second inclined surface includes a joint portion of a molten resin, which is prevented from moving past the protrusion or the recessed groove, such that when the pulley body and flange body are joined together, weld burrs are prevented from being ejected by one of the protrusion and the recessed groove, wherein the cross-section of each of the protrusion and the recessed groove, cut by a plane including a rotation axis, is one of an arc-shape and a trapezoid, the trapezoid having two non-parallel opposing sides, the method comprising:

molding the pulley body through injection molding;

molding the flange body through the injection molding;

placing the pulley body molded so that the first flange is placed on a bottom and the axial direction corresponds to a vertical direction;

placing the flange body molded on the pulley body so that the fitting recess is fitted to the fitting protrusion of the pulley body; and transmitting ultrasonic vibration of a hone of an ultrasonic welding machine to an inside of the flange body and an inside of the pulley body while pushing the flange body downward by the hone, so as to melt the corner of the pulley body mainly, thereby joining the flange body to the pulley body.

* * * * *